(12) United States Patent
Jeung et al.

(10) Patent No.: US 11,566,663 B2
(45) Date of Patent: Jan. 31, 2023

(54) BEARING FOR SUPPORTING A ROTATING COMPRESSOR SHAFT

(71) Applicant: TRANE INTERNATIONAL INC., Davidson, NC (US)

(72) Inventors: Sung Hwa Jeung, Onalaska, WI (US); Charles Roesler, La Crosse, WI (US); Donald Lee Hill, Cornelius, NC (US); Jay H. Johnson, Houston, MN (US); Joseph M. Heger, West Salem, WI (US)

(73) Assignee: TRANE INTERNATIONAL INC., Davidson, NC (US)

(*) Notice: Subject to any disclaimer, the term of this patent is extended or adjusted under 35 U.S.C. 154(b) by 753 days.

(21) Appl. No.: 16/453,408

(22) Filed: Jun. 26, 2019

(65) Prior Publication Data
US 2020/0408245 A1    Dec. 31, 2020

(51) Int. Cl.
| F16C 17/02 | (2006.01) |
| F16C 27/02 | (2006.01) |
| F25B 31/02 | (2006.01) |

(52) U.S. Cl.
CPC ............ *F16C 17/024* (2013.01); *F16C 27/02* (2013.01); *F16C 2360/00* (2013.01); *F25B 31/026* (2013.01); *F25B 2400/07* (2013.01)

(58) Field of Classification Search
CPC .... F16C 17/024; F16C 2360/00; F16C 27/02; F25B 31/026; F25B 2400/07
See application file for complete search history.

(56) References Cited

U.S. PATENT DOCUMENTS

| 3,305,280 A | 2/1967 | Peterson |
| 3,642,331 A | 2/1972 | Silver |
| 3,854,781 A | 12/1974 | Bildtsen |
| 4,394,091 A | 7/1983 | Klomp |
| 4,641,978 A | 2/1987 | Kapich |
| 5,021,697 A | 6/1991 | Kralick |
| 5,272,403 A | 12/1993 | New |

(Continued)

FOREIGN PATENT DOCUMENTS

| CA | 2151687 | 12/1995 |
| DE | 112013004314 T5 | 5/2015 |

(Continued)

OTHER PUBLICATIONS

International Search Report and Written Opinion, International Patent Application No. PCT/US2020/039637, dated Oct. 13, 2020 (12 pages).

(Continued)

*Primary Examiner* — Alan B Waits
(74) *Attorney, Agent, or Firm* — Hamre, Schumann, Mueller & Larson, P.C.

(57) ABSTRACT

A compressor includes a housing, a shaft that is rotated relative to the housing to compress a working fluid, and a foil bearing that supports the shaft. The foil bearing includes a top foil. The foil bearing is a foil gas bearing that is backed up by a ball bearing, or a mesh foil bearing with an actuator to compress a wire mesh dampener. A heat transfer circuit includes a compressor and a working fluid. The compressor includes a shaft that is rotated to compress the working fluid, and a foil bearing for supporting the shaft as it rotates.

14 Claims, 10 Drawing Sheets

(56) References Cited

U.S. PATENT DOCUMENTS

| | | | |
|---|---|---|---|
| 5,714,818 | A | 2/1998 | Eakman et al. |
| 5,977,677 | A | 11/1999 | Henry et al. |
| 6,012,898 | A | 1/2000 | Nakamura et al. |
| 7,800,268 | B2 | 9/2010 | Sun |
| 8,083,413 | B2 | 12/2011 | Ertas |
| 8,414,448 | B2 | 4/2013 | Madge et al. |
| 9,024,494 | B2 | 5/2015 | Hawkins |
| 9,273,723 | B2 | 3/2016 | Park et al. |
| 9,534,629 | B1 | 1/2017 | Lucas et al. |
| 10,087,987 | B2 | 10/2018 | Falomi et al. |
| 2003/0118257 | A1 | 6/2003 | Lee et al. |
| 2010/0307191 | A1 | 12/2010 | Sommer |
| 2013/0170943 | A1* | 7/2013 | Jonsson ................ F04D 29/058 415/1 |
| 2015/0260221 | A1 | 9/2015 | Anders et al. |
| 2015/0362012 | A1 | 12/2015 | Ermilov |
| 2016/0076588 | A1 | 3/2016 | Moratz |
| 2016/0146248 | A1 | 5/2016 | Ertas et al. |
| 2017/0343041 | A1* | 11/2017 | Vogt ...................... F16C 17/024 |
| 2017/0343043 | A1 | 11/2017 | Walsh |
| 2017/0350444 | A1* | 12/2017 | Vogt ........................ F16C 43/02 |
| 2018/0128315 | A1 | 5/2018 | Anders |
| 2018/0149204 | A1 | 5/2018 | Baudelocque |

FOREIGN PATENT DOCUMENTS

| | | | | | |
|---|---|---|---|---|---|
| GB | 2027137 | A | | 2/1980 | |
| JP | 57-163720 | A | | 10/1982 | |
| JP | 2003074550 | A | * | 3/2003 | ............ F16C 17/024 |
| JP | 2005265010 | A | * | 9/2005 | ............ F16C 17/024 |
| JP | 2008-232289 | A | | 10/2008 | |
| JP | 2017-537282 | A | | 12/2017 | |
| KR | 10-2009-0020163 | A | | 2/2009 | |
| KR | 10-2017-0061486 | A | | 6/2017 | |
| KR | 10-2018-0041495 | A | | 4/2018 | |
| WO | 2012/094836 | A1 | | 7/2012 | |

OTHER PUBLICATIONS

Ryu et al., "Wire Mesh Dampers for Semi-Floating Ring Bearings in Automotive Turbochargers: Measurements of Structural Stiffness and Damping Parameters", Energies, 11, 812, pp. 1-19, Apr. 1, 2018.

Extended European Search Report, European Patent Application No. 20830731.4, dated Jul. 5, 2022 (5 pages).

* cited by examiner

BEARING FOR SUPPORTING A ROTATING COMPRESSOR SHAFT

FIELD

This disclosure relates to bearings in compressors. More specifically, this disclosure relates to bearings in compressors utilized in heating, ventilation, air conditioning, and refrigeration ("HVACR") systems.

BACKGROUND

HVACR systems are generally used to heat, cool, and/or ventilate an enclosed space (e.g., an interior space of a commercial building or a residential building, an interior space of a refrigerated transport unit, or the like). A HVACR system may include a heat transfer circuit that utilizes a working fluid for providing cooled or heated air to an area. The heat transfer circuit includes a compressor. The compressor includes a shaft that is rotated to compress the working fluid, and one or more bearings for supporting the rotating shaft within the compressor.

SUMMARY

A HVACR system can include a heat transfer circuit configured to heat or cool a process fluid (e.g., air, water and/or glycol, or the like). The heat transfer circuit includes a compressor that compresses a working fluid circulated through the heat transfer circuit. The compressor can include a housing, a shaft, and one or more bearings for supporting the shaft. The compressor compresses the working fluid by rotating the shaft relative to the housing. The bearing(s) support the shaft relative to the housing while the shaft rotates.

In an embodiment, the bearing(s) include a radial foil gas bearing and a radial ball bearing configured for radially supporting the shaft while it rotates. The radial ball bearing backs up the radial foil gas bearing. The radial ball bearing is configured to contact and radially support the shaft when the shaft compresses the radial foil gas bearing by a predetermined amount.

In an embodiment, when the bump foil is uncompressed, the radial bump foil is closer to the shaft than the ball bearing. In an embodiment, the radial foil gas bearing and the radial ball bearing have different axial locations along the shaft.

In an embodiment, the radial foil gas bearing includes a bump foil and a top foil. The top foil extends between the bump foil and the shaft. The radial ball bearing is configured to prevent the shaft from compressing the radial foil gas bearing such that the bump foil is plastically deformed. In an embodiment, the radial ball bearing prevents the shaft from compressing the bump foil by more than about 50%.

In an embodiment, the compressor also includes a first thrust bearing and a thrust ball bearing for axially supporting the shaft when it rotates. The thrust ball bearing backs up the first thrust bearing. In an embodiment, the first thrust bearing is a thrust foil gas bearing. The thrust ball bearing prevents the shaft from compressing the thrust foil gas bearing such that the thrust foil gas bearing is plastically deformed.

In an embodiment, the first thrust bearing is a magnetic thrust bearing. The thrust ball bearing prevents the shaft from contacting the magnetic thrust bearing during harsh operating conditions.

In an embodiment, the bearing(s) include a mesh foil bearing. The mesh foil bearing includes a pad and an actuator. The pad includes a top foil and a wire mesh dampener. The actuator is configured to be actuated with compressed gas to compress the wire mesh dampener.

In an embodiment, the pad of the mesh foil bearing includes a rear plate and the wire mesh dampener is disposed between the rear plate and the top foil. In an embodiment, the actuator is affixed to the rear plate and the actuator compresses the wire mesh dampener by moving the rear plate closer to the top foil.

In an embodiment, the compression of the wire mesh dampener by the actuator increases the stiffness of the top foil.

In an embodiment, the mesh foil bearing is a radial mesh foil bearing. In an embodiment, the mesh foil bearing includes an outer sleeve with a through-hole. The actuator extends through the through-hole in the outer sleeve.

In an embodiment, the bearing(s) includes a radial foil bearing with a top foil, and an external surface of the shaft that faces the top foil includes a herringbone groove.

In an embodiment, the compressor is a centrifugal compressor.

BRIEF DESCRIPTION OF THE DRAWINGS

Both described and other features, aspects, and advantages of a heat transfer circuit and methods of operating a heat transfer circuit will be better understood with the following drawings.

Like reference characters refer to similar features.

DETAILED DESCRIPTION

Figure 1:
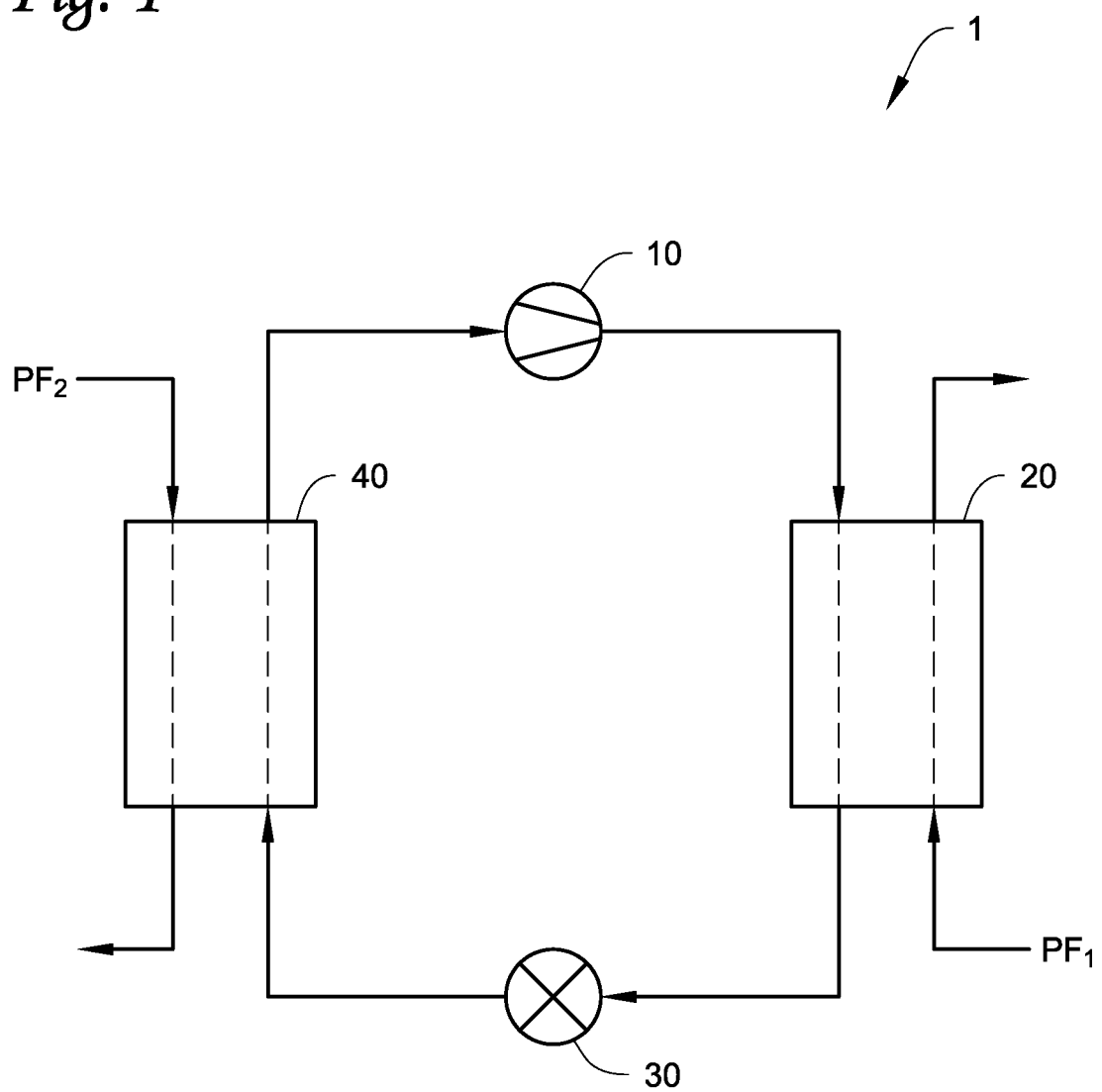
FIG. 1 is a schematic diagram of a heat transfer circuit of an HVACR system in an embodiment.

A heating, ventilation, air conditioning, and refrigeration ("HVACR") system is generally configured to heat and/or cool an enclosed space (e.g., an interior space of a commercial or residential building, an interior space of a refrigerated transport unit, or the like). The HVACR system includes a heat transfer circuit that includes a compressor and a working fluid (e.g., a refrigerant, a refrigerant mixture, or the like) that circulates through the heat transfer circuit. The working fluid is utilized to heat or cool a process fluid (e.g., air, water and/or glycol, or the like).

The compressor includes a housing, a shaft that is rotated relative to the housing to compress the working fluid, and one or more bearings to support the shaft while it rotates. A compressor can undergo stall or surge when operating. Stall occurs, for example, when the flow through the compressor has a localized region with a reduced velocity and an adverse pressure gradient(s). This localized region can result in flow separation and/or flow misalignment when encountering a compressing component of a compressor (e.g., an impeller, screw, and the like). Stall can occur at various operating conditions of the compressor, but is more likely to occur when operating the compressor closer to upper and lower boundaries for its volumetric flow rate in its operating map. Surge occurs, for example, when there is a full reversal of flow through the compressor. Surge is system phenomenon that occurs based on the configuration of the compressor and other components of the heat transfer circuit (e.g., piping, valves, and the like). For example, an emergency shutdown and/or power loss of the compressor or the heat transfer circuit can cause a surge. A shock load occurs, for example, when the fluid entering the compressor contains an excessive amount of liquid. The higher-density fluid impacts the compression component (e.g., the impeller, screw, and the like) of the compressor and can radially and/or axially push the compression component. For example, the occurrence of liquid suction carryover in the heat transfer circuit can cause a shock load. Stall, surge, and/or a shock load can cause an increase in the axial and/or radial load of the rotating shaft. In particular, stall, surge, and/or a shock load can create a significant increase in the rotating shaft's radial load. Further, the operating conditions that allow some compressors to operate at higher efficiencies may be close to those operating conditions that can cause stall and/or surge.

A radial foil gas bearing or a radial mesh foil bearing can be used to radially support the shaft while it rotates. A magnetic thrust bearing or foil gas bearing can be utilized to axially support the shaft while it rotates. A radial foil gas bearing, a thrust foil gas bearing, and a thrust magnetic bearing are each able to provide advantageous lower friction with the shaft. This lower friction is especially advantageous when used with shafts that are rotated at higher speeds.

When a foil gas bearing is used to support the rotating shaft, the significant increases in the load caused by, for example, stall, surge, and/or a shock load can compress the foil gas bearing to such a degree that the bump foil gas bearing is plastically deformed. A structure can have an elastic limit that is the amount of compression that causes plastic deformation of the structure. A structure when plastically deformed does not return to its original shape after the compression is removed. When compressed by less than this elastic limit, the structure is only elastically deformed. A structure when elastically deformed returns to its original shape after the compression is removed. As compression of the structure begins and increases, the structure is first elastically deformed and is then plastically deformed once reaching its elastic limit. For example, factors that determined the elastic limit include, but are not limited to, a structure's material properties and original shape. Stall, surge, and/or a shock load can significantly increase the dynamic load of the shaft causing the shaft to compress and deform the foil of the foil gas bearing, which damages and degrades the performance of the foil gas bearing. When a magnetic thrust bearing is used to support the rotating shaft, significant increases in the axial load caused by, for example, stall, surge, and/or a shock load, can cause the rotating shaft to contact the magnetic thrust bearing. This contact can damage the magnetic thrust bearing and/or the shaft. When a radial mesh foil bearing is used to support the rotating shaft, excessive radial load(s) caused by, for example, stall, surge, and/or a shock load can cause the rotating shaft to contact the radial mesh foil bearing. This direct contact can damage the radial mesh foil bearing and/or the shaft.

Embodiments described herein are directed to compressors, and HVACR systems that include compressors, that utilize at least one foil bearing or magnetic thrust bearing for higher efficiency and have a configuration that prevents damage to the foil bearing or the magnetic thrust bearing during harsh operating conditions.

FIG. 1 is a schematic diagram of a heat transfer circuit 1 of a HVACR system, according to an embodiment. The heat transfer circuit 1 includes a compressor 10, a condenser 20, an expansion device 30, and an evaporator 40. In an embodiment, the heat transfer circuit 1 can be modified to include additional components. For example, the heat transfer circuit 1 in an embodiment can include an economizer heat exchanger, one or more flow control devices, a receiver tank, a dryer, a suction-liquid heat exchanger, or the like.

The components of the heat transfer circuit 1 are fluidly connected. The heat transfer circuit 1 can be configured as a cooling system (e.g., a fluid chiller of an HVACR, an air conditioning system, or the like) that can be operated in a cooling mode, and/or the heat transfer circuit 1 can be configured to operate as a heat pump system that can run in a cooling mode and a heating mode.

The heat transfer circuit 1 applies known principles of gas compression and heat transfer. The heat transfer circuit can be configured to heat or cool a process fluid (e.g., water, air, or the like). In an embodiment, the heat transfer circuit 1 may represent a chiller that cools a process fluid such as water or the like. In an embodiment, the heat transfer circuit 1 may represent an air conditioner and/or a heat pump that cools and/or heats a process fluid such as air, water, or the like.

During the operation of the heat transfer circuit 1, a working fluid (e.g., refrigerant, refrigerant mixture, or the like) flows into the compressor 10 from the evaporator 40 in a gaseous state at a relatively lower pressure. The compressor 10 compresses the gas into a high pressure state, which also heats the gas. After being compressed, the relatively higher pressure and higher temperature gas flows from the compressor 10 to the condenser 20. In addition to the working fluid flowing through the condenser 20, a first process fluid $PF_1$ (e.g., external air, external water, chiller water, or the like) also separately flows through the condenser 20. The first process fluid absorbs heat from the working fluid as the first process fluid $PF_1$ flows through the condenser 20, which cools the working fluid as it flows through the condenser. The working fluid condenses to liquid and then flows into the expansion device 30. The expansion device 30 allows the working fluid to expand, which converts the working fluid to a mixed vapor and liquid state. An "expansion device" as described herein may also be referred to as an expander. In an embodiment, the expander may be an expansion valve, expansion plate, expansion vessel, orifice, or the like, or other such types of expansion mechanisms. It should be appreciated that the expander may be any type of expander used in the field for expanding a working fluid to cause the working fluid to decrease in temperature. The relatively lower temperature, vapor/liquid working fluid then flows into the evaporator 40. A second process fluid $PF_2$ (e.g., air, water, or the like) also flows through the evaporator 40. The working fluid absorbs heat from the second process fluid $PF_2$ as it flows through the evaporator 40, which cools second process fluid $PF_2$ as it flows through the evaporator 40. As the working fluid absorbs heat, the working fluid evaporates to vapor. The working fluid then returns to the compressor 10 from the evaporator 40. The above-described process continues while the heat transfer circuit 1 is operated, for example, in a cooling mode.

Figure 2:
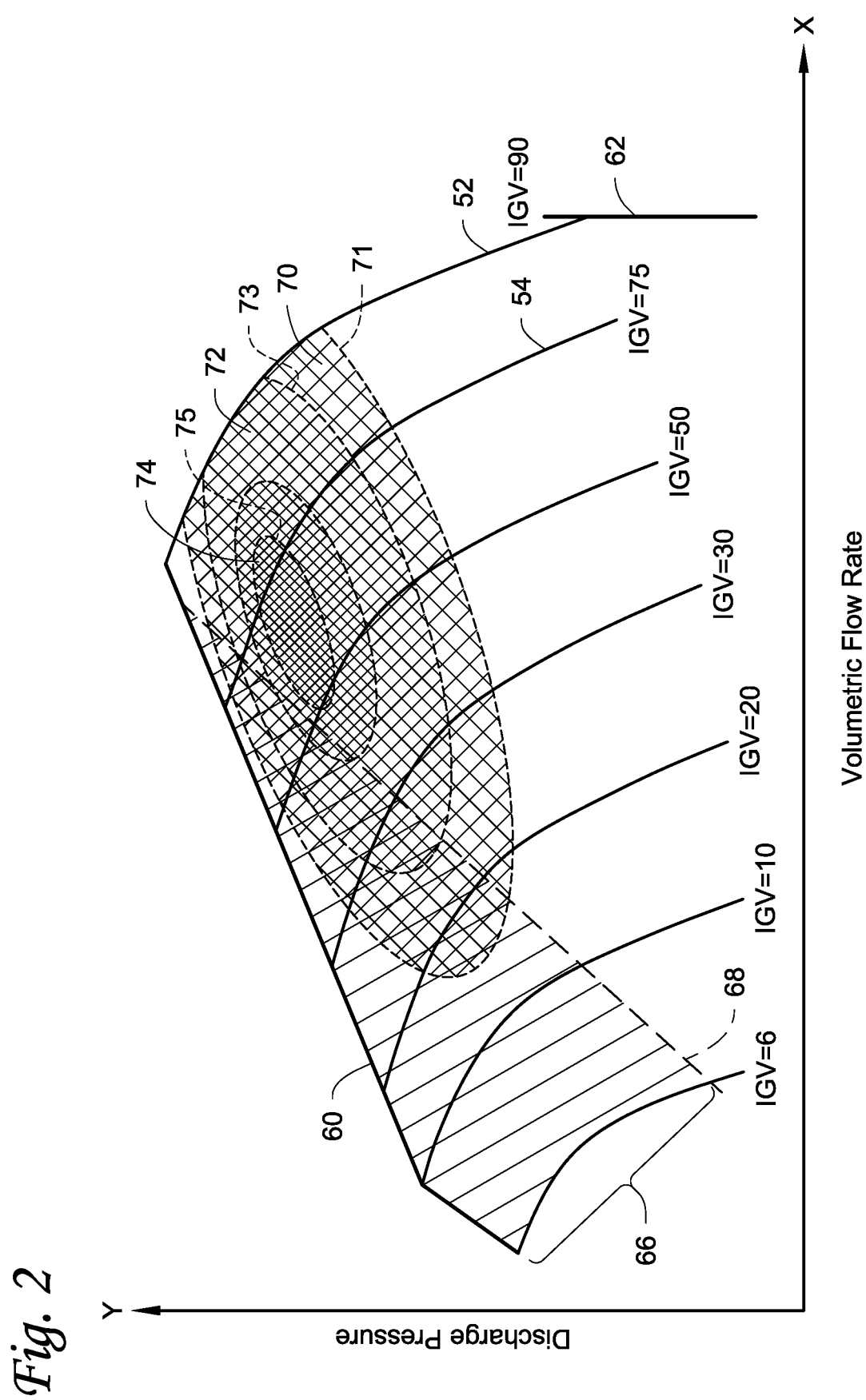
FIG. 2 illustrates an operating map for a centrifugal compressor in an embodiment.

In an embodiment, the compressor 10 is a centrifugal compressor. FIG. 2 illustrates an operating map for a centrifugal compressor. The operating map as discussed below can be applied similarly for a single stage compressor, a multi-stage compressor, or a single stage in a multi-stage compressor. In FIG. 2, the x-axis is the volumetric flow rate of compressed working fluid from the compressor 10 and the y-axis is the discharge pressure of the compressor 10. The operating map includes curves (e.g., curve 52, curve 54) for an angle of an inlet guide vane (IGV) (discussed below) of the compressor 10. For example, curve 52 is for the IGV having an angle of 90 degrees. A first thick line 60 represents where surge occurs, and a second thick line 62 represents where choke occurs. Accordingly, it may be desired not to operate above the line 60, or to the right of the line 62. A large dashed line 68 represents conditions at which stall starts to occur and defines a lower boundary of a stall area 66. Stall occurs when the compressor 10 is operated within the stall area 66.

Areas 70, 72, 74 representing higher compressor efficiencies are each defined by a respective dashed line 71, 73, 75. For example, the operating conditions along the dashed line 71 have the same efficiency, and the compressor 10 operates at higher efficiency when operated within the area 70. For example, operating conditions that are within the area 70 but outside the area 74 have a lower efficiency then those operating conditions that are within the area 74. It is desired to operate the compressor 10 within the area 70 to provide higher efficiency. It may be more desired to operate the compressor 10 within the area 74 to provide an even better efficiency.

As shown in FIG. 2, the higher efficiency areas 70, 72, 74 include portions within the stall area 66. When a specific volumetric flow rate or discharge pressure is desired, an operating condition within the stall area 66 is needed to still operate with higher efficiency (e.g., to operate in one of the areas 70, 72, 74). Stall causes increased vibration of the compressor 10 and an increased radial load and/or axial load to the rotating shaft (discussed above) of the compressor 10. In some embodiment, a desired output of the heat transfer circuit 1 can lead to operating the compressor 10 in conditions that cause surge.

In an embodiment, the compressor 10 may be a rotary compressor or scroll compressor. It should be appreciated that the operating map for a rotary compressor or for a scroll compressor may include features similar those shown in the operating map of FIG. 2 (e.g., curves, a choke line, a surge line, stall area, areas of higher efficiency). In an embodiment, the operating map may vary based on the composition of the working fluid.

Figure 3:
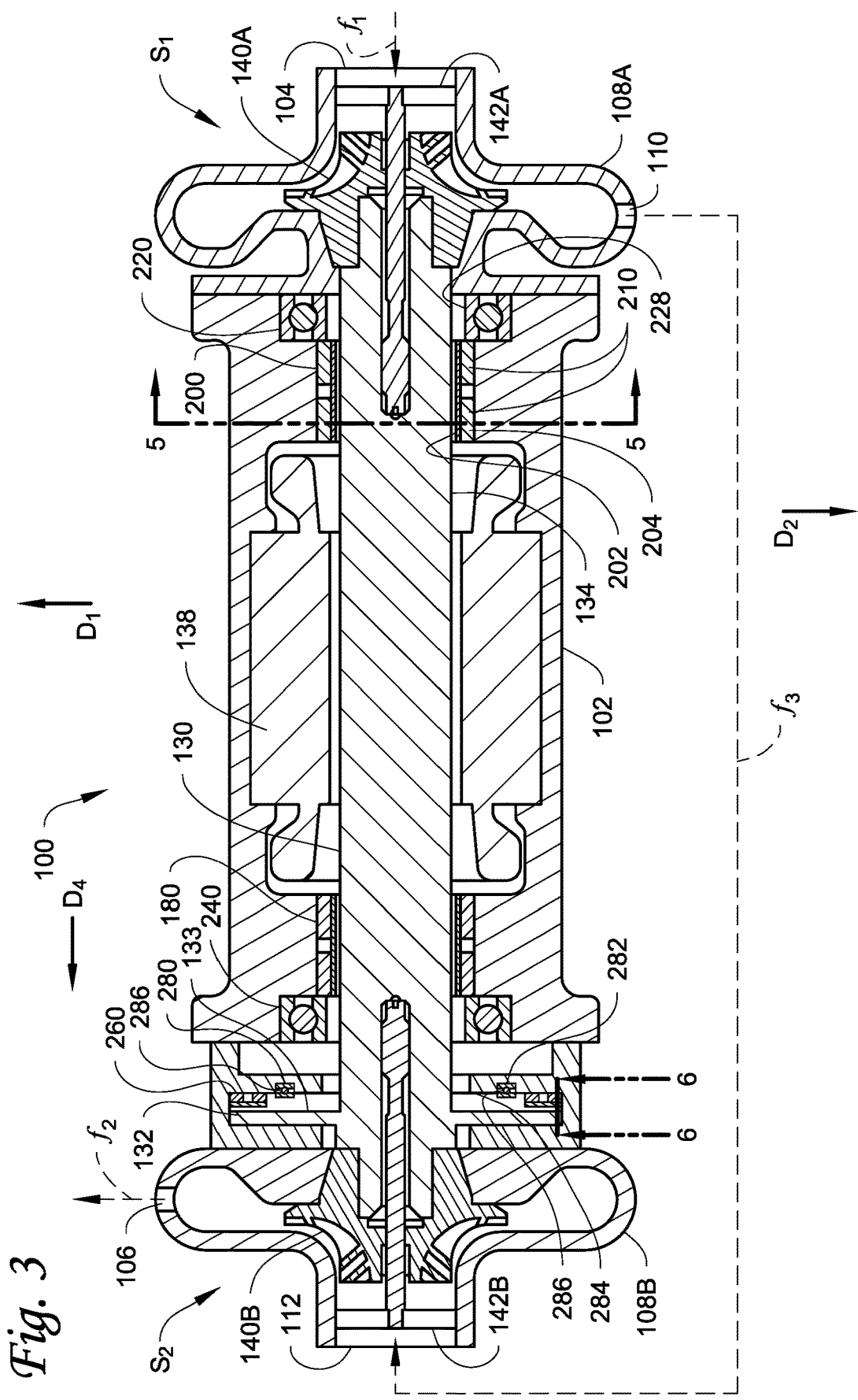
FIG. 3 is a cross-sectional view of a centrifugal compressor in an embodiment.

FIG. 3 is a cross-sectional view of a centrifugal compressor 100 in an embodiment. In an embodiment, the centrifugal compressor 100 in FIG. 3 may be the compressor 10 employed in the heat transfer circuit 1 in FIG. 1 to compress working fluid. The compressor 100 includes a housing 102, a shaft 130, a stator 138, and impellers 140A, 140B. The housing 102 includes an inlet 104, an outlet 106, and endcaps 108A, 108B for the impellers 140A, 140B. The working fluid to be compressed enters the compressor 100 through the inlet 104 as shown by the dashed arrow $f_1$. The compressed working fluid is discharged from the compressor 100 through the outlet 106 as shown by the dashed arrow $f_2$. In an embodiment, the compressor 100 is an oil-free compressor.

The compressor 100 has a first compression stage $S_1$ with the first impeller 140A and a second compression stage $S_2$ with the second impeller 140B. Each stage $S_1$, $S_2$ also includes an inlet vane guide (IVG) 142A, 142B. The housing 102 includes an intermediate outlet 110 in the endcap 108A for the first stage $S_1$, and an intermediate inlet 112 in the endcap 108B for the second stage $S_2$. The working fluid flows from the first stage $S_1$ to the second stage $S_2$ through the intermediate outlet 110 and the intermediate inlet 112 as shown by the dashed line $f_3$. In an embodiment, the dashed line $f_3$ may be a line that fluidly connects 110 and 112. The dashed line $f_3$ is shown in FIG. 3 as extending outside of the housing 102. However, it should be appreciated that the flow path shown by the dashed line $f_3$ may extend partially or completely within the housing 102 in an embodiment.

The impellers 140A, 140B and the inlet guide vanes 142A, 142B are each fixedly attached to the shaft 130. The stator 138 rotates the shaft 130 which rotates the impellers 140A, 140B and the inlet guide vanes 142A, 142B. The working fluid is compressed in the first stage $S_1$ and the second stage $S_2$ by the rotating impellers 140A, 140B, respectively. A working fluid to be compressed is suctioning through the inlet 104, compressed in the first stage $S_1$, flows from the first stage $S_1$ to the second stage $S_2$, is further compressed in the second stage $S_2$, and is then discharged through the outlet 106. The working fluid discharged from the second stage $S_2$ via the outlet 106 has a higher pressure than the working fluid discharged from the first stage $S_1$ via the intermediate inlet 110.

The compressor 100 includes bearings 180, 200, 220, 240, 260, 280 for supporting the shaft 130 within the housing 102 while the shaft rotates. Radial bearings 180, 200, 220, 240 radially support the shaft 130 and thrust bearings 260, 280 axially support the shaft 130 while it rotates. The thrust bearings 260, 280 axially support the shaft 130 in an axial direction $D_4$ while it rotates.

In an embodiment, the radial bearings 180, 200 are radial foil gas bearings that radially support the shaft 130 in the radial direction and the radial bearings 220, 240 are radial ball bearings that backup the radial foil gas bearings 180, 200. The radial ball bearing 220 backs up the radial foil gas bearing 200, and the radial ball bearing 240 backs up the radial foil gas bearing 180.

The shaft 130 includes a thrust runner 132 that extends in the radial direction of the shaft 130. The thrust runner 132 includes a thrust surface 133. In an embodiment, the thrust bearing 260 is a thrust foil gas bearing that axially supports the shaft 130 in an axial direction $D_4$, and the thrust bearing 280 is a thrust ball bearing that backs up the thrust foil gas bearing 260. The thrust foil gas bearing 260 and the thrust ball bearing 280 each face the thrust surface 133 of the thrust runner 132 of the shaft 130 in the axial direction $D_4$.

The thrust foil gas bearing 260 is located radially outward of the thrust ball bearing 280 in FIG. 3. However, the thrust foil gas bearing 260 in an embodiment may be located radially inward of the thrust ball bearing 280. The compressor 100 only includes a single thrust foil gas bearing 260 with a thrust ball bearing 280. However, it should be appreciated that the compressor 100 in an embodiment may include a second thrust foil bearing (not shown) with a respective thrust ball bearing (not shown) that have similar structures as the thrust foil gas bearing 260 and the thrust ball bearing 280. In an embodiment, the second thrust foil gas bearing and thrust ball bearing may face the thrust runner 132 in an opposite direction such that the thrust runner 132 is disposed between the pair of thrust foil gas bearings 260.

The thrust ball bearing 280 includes a lower race 282, an upper race 284, and rolling elements 286 (e.g., balls, rollers, or the like) sandwiched between the lower race 282 and the upper race 284. The lower race 282 is attached to the housing 102 so that the lower race 282 does not rotate relative to the housing 102. The rolling elements 286 allow the upper race 284 to rotate relative to the lower race 282 and the housing 102. The rolling elements 286 allow for rotation of the upper race 284 while the thrust ball bearing 280 supports a load (e.g., the axial load of the rotating shaft 130). In an embodiment, the lower race 284 is attached to the housing 102 by the radial ball bearing 280 being embedded into the housing 102.

Figure 4:
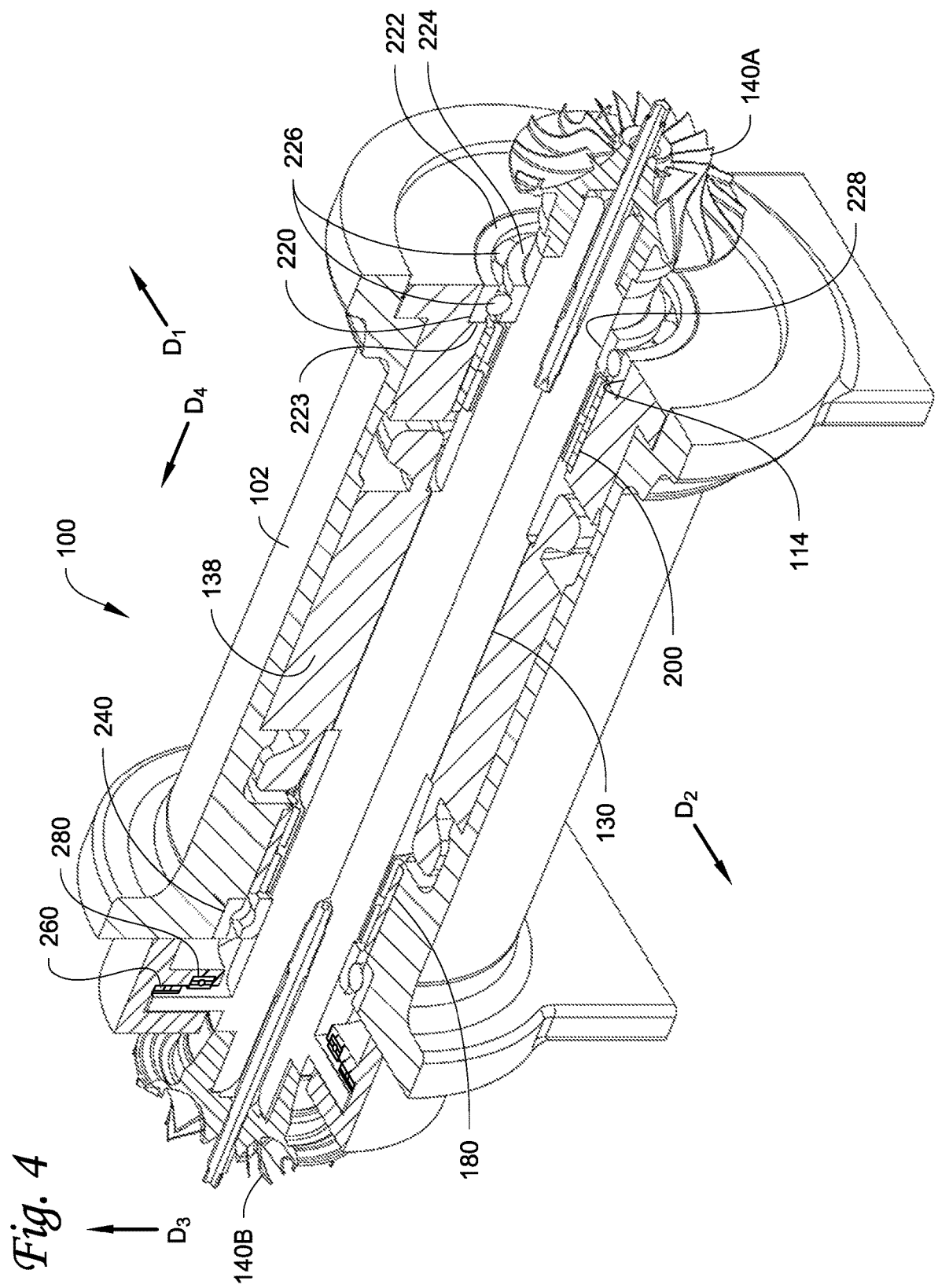
FIG. 4 is a cutaway view of the compressor in FIG. 3, according to an embodiment.

FIG. 4 is a partial cutaway view of the compressor 100 in an embodiment. The endcaps 108A, 108B and the inlet guide vanes 142A, 142B are omitted in FIG. 4. The radial ball bearing 220 includes an outer race 222, an inner race 224, and rolling elements 226 (e.g., balls, rollers, or the like) sandwiched between the outer race 222 and the inner race 224. The outer race 222 is attached to the housing 102 and does not rotate relative to the housing 102. In an embodiment, the outer race 222 is attached to the housing 102 by the radial ball bearing 220 being friction fitted into an opening 114 of the housing 102. In an embodiment, the radial ball bearing 220 may be line-to-line fit or interference fit with the housing 102. The rolling elements 226 allow the inner race 224 to rotate relative to the outer race 222 and the housing 102 even when the inner race 224 is supporting a load (e.g., a radial load of the rotating shaft 130).

The inner race 224 has an inner surface 228 that faces an external surface 134 of the shaft 130 in a radial direction of the shaft 130 (e.g., in direction $D_1$, in direction $D_2$, in direction $D_3$, or the like). The radial ball bearing 220 is configured to backup the foil gas bearing 200 and provide radial support for the shaft 130 when operating the compressor 100 under harsh operating conditions (e.g., during surge, during stall, during a shock load, or the like).

Accordingly, the ball bearing 220 does not provide radial support to the shaft 130 during normal operation of the compressor 100. In an embodiment, normal operation of the compressor 100 occurs when the compressor 100 is not experiencing stall, surge, and/or a shock load. For example, as shown in FIG. 3, the radial ball bearing 220 is spaced apart from the shaft 130 such that the inner surface 228 is not in contact with external surface 134 of the shaft 130. As shown in FIG. 4, the outer race 222 includes a side surface 223 that faces and contacts the housing 102 in the axial direction $D_4$. Accordingly, when the ball bearing 220 contacts the shaft as described below, the ball bearing 220 may also provide some axial support to the shaft 130.

The radial ball bearing 220 has a different axial location along the shaft 130 than the radial foil gas bearing 200. For example, the radial ball bearing 220 does not overlap with the radial foil gas bearing 200 in a radial direction (e.g., in direction $D_1$, in direction $D_2$, in direction $D_3$, or the like) that the radial ball bearing 220 backs up. In FIG. 3, the radial foil gas bearing 200 and the radial ball bearing 220 are directly adjacent in the axial direction $D_4$. In an embodiment, the radial gas bearing 200 may be spaced apart from its backup radial ball bearing 220 in the axial direction $D_4$.

The compressor 100 in FIGS. 3 and 4 includes two stages $S_1$, $S_2$. However, the compressor 100 in an embodiment may include a different number of stages than two. In an embodiment, the compressor 100 may include a single stage. In another embodiment, the compressor 100 may include three or more stages.

Figure 5:
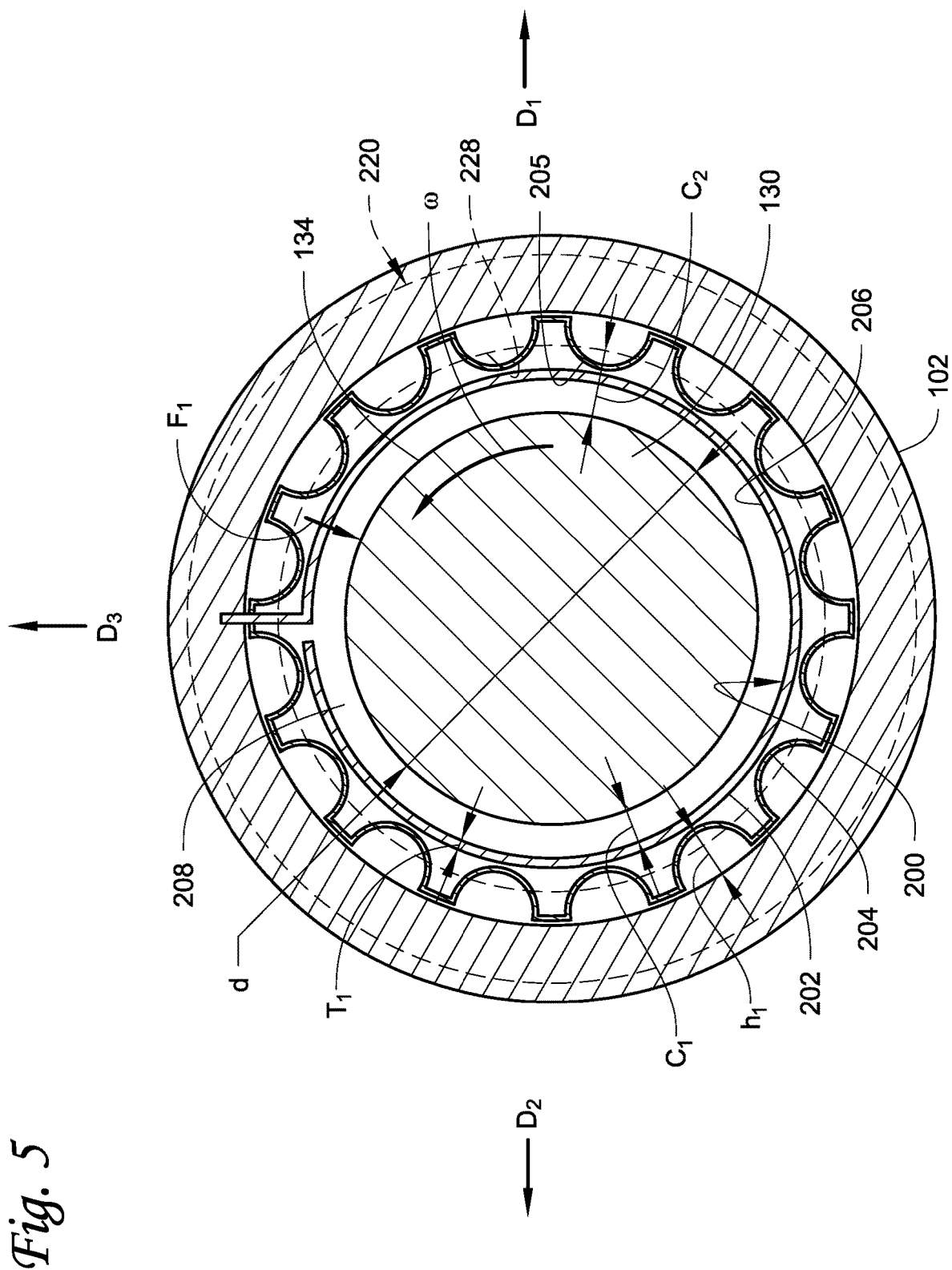
FIG. 5 is a partial cross-sectional view of the compressor in FIG. 3 along the line 5-5, according to an embodiment.

FIG. 5 is a cross-sectional view of the compressor 100 along the line 5-5 in FIG. 3. FIG. 5 shows the configuration of the shaft 130, the radial foil gas bearing 200, and the radial ball bearing 220 that backs up the radial foil gas bearing 200. The radial ball bearing 220 is shown in dashed lines in FIG. 5 as the radial ball bearing 220 is behind the radial foil gas bearing 200 and obscured from the viewpoint along line 5-5.

The radial foil gas bearing 200 includes a top foil 202 and a bump foil 204. The top foil 202 extends around the shaft 130 between the external surface 134 of the shaft 130 and the bump foil 204. The top foil 202 and bump foil 204 are each attached to the housing 102. The bump foil 204 is located between the housing 102 and the top foil 202. The bump foil 204 is compressible in the radial direction of the shaft 130 (e.g., in direction $D_1$, in direction $D_2$, in direction $D_3$, or the like) towards the housing 102. The bump foil 204 acts as a dampener for the top foil 202. The bump foil 204 may also be known as a compliant supply structure in a foil gas bearing. An inner surface 206 of the radial foil gas bearing 200 is provided by the top foil 202 and faces the external surface 134 of the shaft 130. The inner surface 206 is the innermost surface of the radial foil gas bearing 200.

As shown in FIG. 3, the bump foil 204 includes two separate portions 210 that support the top foil 202. It should be appreciated that the radial foil gas bearing 200 in an embodiment may include bump foil 204 with a different number of portions 210 than two. In an embodiment, the bump foil 204 may include one or more portions 210 that support the top foil 202. In an embodiment, the bump foil 204 may be a single piece.

In FIG. 5, the shaft 130 rotates in a counter clockwise direction as indicated by the arrow ω. Friction causes the gas along the external surface 134 of the shaft 130 to flow with the rotation of the shaft 130. The inner surface 206 of the radial foil gas bearing 200 includes one or more structures (e.g., bumps, inclines, or the like) that cause the gas to be compressed as it flows with the rotating external surface 134 of the shaft 130. The compressed gas forms into a thin layer 208 between the radial foil gas bearing 200 and the shaft 130. The thin layer of compressed gas 208 radially supports the shaft 130. In an embodiment, the inner surface 206 of the radial foil gas bearing 200 may include those structure(s) known in the art for radial foil gas bearings to help form a layer of compressed gas. For example, structures that help form a layer of compressed gas may include, but are not limited to, surface coatings (e.g, Teflon, Molybdenum disulfide, or the like) and/or grooves.

In an embodiment, normal operation of the compressor 100 occurs when the compressor is not experiencing stall, surge, and/or a shock load. During normal operation of the compressor 100, the inner surface 206 of the radial foil gas bearing 200 is closer to the shaft 130 than the inner surface 228 of the radial ball bearing 200. In an embodiment, during normal operation of the compressor 100, the radial foil gas bearing 200 has a clearance $C_1$ and the radial ball bearing 220 has a clearance $C_2$. The clearance $C_1$ is the minimum distance from the inner surface 206 of the radial foil gas bearing 200 to the external surface 134 of the shaft 130. The clearance $C_1$ is determined when the foil gas bearing 200 is not being compressed. The clearance $C_2$ is the minimum distance from the inner surface 228 of the radial ball bearing 220 to the external surface 134 of the shaft 130. The clearance $C_2$ of the radial ball bearing 220 is larger than the clearance $C_1$ of the radial foil gas bearing 200 ($C_2 > C_1$). During normal operation of the compressor 100, the radial ball bearing 220 does not provide radial support for the rotating shaft 130. For example, the radial ball bearing 200 is spaced apart from the shaft 130 during the normal operation of the compressor 100.

In an embodiment, the layer of compressed gas 208 compresses the bump foil 204 by at or about 3 to at or about 7% when the compressor is operated at normal operation. In an embodiment, the amount of compression of the bump foil 204 caused by the layer of compressed gas 208 depends on the stiffness of the bump foil 204. A larger force is applied to the shaft 130 when stall, surge, and/or a shock load occur. For example, force $F_1$ in FIG. 5 represents a direction in which this larger force may be applied to the shaft 130 in an embodiment. This larger force is greater than the radial support provided by the layer of compressed gas 208. Thus, the larger force of the stall, surge, and/or shock load pushes the shaft 130 to contact the inner surface 206 of the radial foil gas bearing 200 and to compress the bump foil 204. For example, in the embodiment in which the force $F_1$ in FIG. 5 represents the larger force, the larger force moves the shaft 130 in the direction of the force $F_1$.

The radial ball bearing 220 is configured to prevent the shaft 130 from compressing the bump foil 204 to such a degree that the bump foil 204 is plastically deformed. The plastic deformation of the bump foil 204 damages and degrades the performance of the bump foil 204. The shaft 130 comes into contact with the inner surface 228 of the radial ball bearing 220 after compressing the bump foil 204 by a predetermined amount. After the bump foil 204 is compressed by the predetermined amount, the radial ball bearing 220 then radially supports the shaft 130 which prevents the shaft 130 from further compressing the bump foil 204.

The radial ball bearing 220 is configured to limit the amount that the shaft 130 is able to compress the bump foil 204. The radial ball bearing 220 is configured to prevent the shaft 130 from compressing and plastically deforming the bump foil 204. In an embodiment, the bump foil 204 is plastically deformed when compressed by more than an amount. For example, this amount can vary based on the structure and configuration of the bump foil 204 (e.g., stiffness, shape, construction material(s) of the bump foil 204, or the like). The radial ball bearing 220 contacts and supports the shaft 130 before the bump foil 204 is compressed by more than this amount that non-elastically deforms the bump foil 204. In an embodiment, the radial ball bearing 220 only allows for the bump foil 204 to be compressed by an amount that is less than the amounts that plastically deform the bump foil 204. In an embodiment, the bump foil 204 is plastically deformed when compressed to at least the elastic limit of the bump foil 204. The radial ball bearing 220 is configured to contact and support the shaft 130 when the bump foil 204 is compressed by a predetermined amount that is within the range of greater than 0% and less than the elastic limit of the bump foil 204. The radial ball bearing 220 contacts and supports the shaft 130 when the bump foil 204 is compressed by the predetermined amount. The predetermined amount is the maximum amount that the bump foil 204 can be compressed by the rotating shaft 130. In an embodiment, the predetermined amount is greater than the amount that the bump foil 204 is compressed by the shaft 130 when the compressor 100 is not operating.

In an embodiment, the clearance $C_2$ of the radial ball bearing 220 is based on the maximum amount of compression of the bump foil 204 allowed by the radial ball bearing 220. The predetermined amount may be selected based on the particular structure and configuration of the foil gas bearing 200 (e.g., diameter, stiffness, or the like) and the compression at which the bump foil 204 is plastically deformed. In an embodiment, the predetermined amount may be an amount at or about 30% or less than 30% and greater than 0%. In an embodiment, the predetermined amount may be an amount at or about 50% or less than 50% and greater than 0%. In an embodiment, the predetermined amount is greater than the compression caused by the layer of compressed gas 208.

The bump foil 204 has a height $h_1$ and the top foil 202 has a thickness $T_1$. The thickness $T_1$ of the top foil 202 is measured along a radial direction of the shaft 130 (e.g., along direction $D_1$, direction $D_2$, direction $D_3$, or the like). The height $h_1$ of the bump foil 204 is measured along a radial direction of the shaft 130 (e.g., along direction $D_1$, direction $D_2$, direction $D_3$, or the like). In an embodiment, the height $h_1$ of the bump foil 204 may vary around its circumference. In an embodiment, the height $h_1$ is the maximum distance from the housing 102 to an upper surface 205 of the bump foil 204 that contacts the top foil 202 along a radial direction of the shaft 130. The clearance $C_2$ in FIG. 5 is equal to or about the sum of the thickness of the bump foil 204 when compressed by the predetermined amount, the clearance $C_1$ of the radial foil gas bearing 200, and the thickness $T_1$ of the top foil 202 ($C_2 \approx (h_1 *$predetermined amount$) + C_1 + T_1$). In an embodiment, the diameter d of the shaft 130 may be different along the radial bump foil bearing 200 and the radial ball bearing 220. In such an embodiment, the clearance $C_2$ would be decreased or increased based on the whether the shaft 130 has a larger or smaller diameter d, respectively, along the radial foil gas bearing 200 and the radial ball bearing 220.

In an embodiment, the predetermined amount is at or about 50%. In such an embodiment, the maximum amount of compression allowed by the ball bearing 220 is at or about 50%. The radial ball bearing 220 being configured to contact and provide radial support to shaft 130 when the bump foil 204 is compressed by at or about 50%. In such an embodiment, the clearance $C_2$ of the radial ball bearing 220 may be equal to or about the sum of 50 percent of the thickness $h_1$ of the bump foil 204, the clearance $C_1$ of the radial foil gas bearing 200, and the thickness $T_1$ of the top foil 202 ($C_2 \approx 0.5 * h_1 + C_1 + T_1$).

As shown in FIGS. 3 and 4, the compressor 100 also includes a second radial foil gas bearing 180 with a corresponding radial ball bearing 240 for backup. The second radial foil gas bearing 180 and the second radial ball bearing 240 have a similar configuration and operate in a similar manner as discussed above with respect to the radial foil gas bearing 200 and the radial ball bearing 220. The compressor 100 includes two radial foil gas bearings 180, 200 each having a respective backup radial ball bearing 220, 240. However, it should be appreciated that the compressor 100 in an embodiment may have a different number of radial foil gas bearings 180, 200 with a corresponding number of backup ball bearings 220, 240. In an embodiment, the compressor 100 may include one or more radial foil gas bearings 180, 200 with each radial foil gas bearing 180, 200 having a respective backup ball bearing 220, 240.

Figure 6:
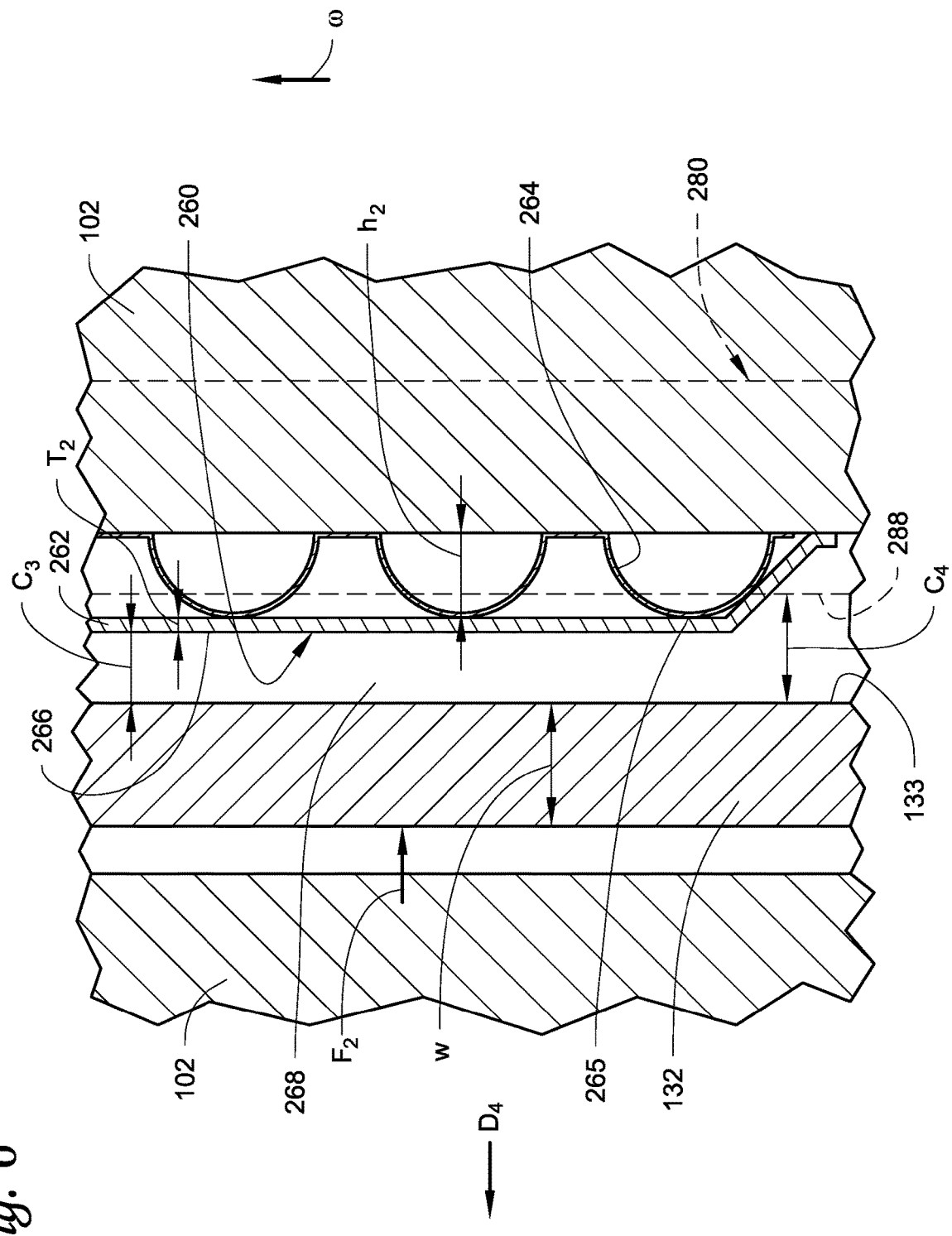
FIG. 6 is a partial cross-sectional view of the compressor in FIG. 3 along the line 6-6 in FIG. 3, according to an embodiment.

FIG. 6 is a partial cross-sectional view of the compressor 100 along the line 6-6 in FIG. 3. FIG. 6 illustrates the configuration of the thrust runner 132, the thrust foil gas bearing 260, the thrust ball bearing 280 that backs up the thrust foil gas bearing 260. As shown in FIGS. 2 and 3, the thrust foil gas bearing 260 has a different radial location along the thrust runner 132 of the shaft 130 than the thrust ball bearing 280. For example, the thrust ball bearing 280 is located radially inward of the thrust foil gas bearing 260 and does not overlap with the thrust foil gas bearing 260 in the axial direction $D_4$. The thrust ball bearing 280 is shown in dashed lines in FIG. 6 as the thrust ball bearing 280 is located behind the thrust foil gas bearing 260 in the viewpoint from line 6-6.

The thrust runner 132 rotates in the direction indicated with the arrow ω. The thrust surface 133 of the thrust runner 132 provides a surface for axially supporting the shaft 130. The thrust foil gas bearing 260 includes a top foil 262 and a bump foil 264. The top foil 262 extends around the shaft 130 between the bump foil 264 and the thrust surface 133 in axial direction $D_4$. The bump foil 264 is located between the housing 102 and the top foil 262. The bump foil 264 is configured to be compressible along the axial direction $D_4$ towards the housing 102 to which the bump foil 264 is attached. An upper surface 266 of the thrust foil gas bearing 260 is provided by the top foil 262 and faces the thrust surface 133 of the shaft 130 in the axial direction $D_4$. The thrust ball bearing 280 includes an upper surface 288 that faces the thrust surface 133 in the axial direction $D_4$. The upper surface 288 is the uppermost surface and the support surface of the thrust ball bearing 280.

The upper surface 266 of the foil gas bearing 260 has one or more structures (e.g., bumps, inclines, or the like) that cause gas pulled along the rotating thrust surface 133 to be compressed. As the shaft 130 rotates, a thin layer of compressed gas 268 is formed between the thrust foil gas bearing 260 and the thrust surface 133 of the thrust runner 132 by the upper surface 266 and the rotating shaft 130. In an embodiment, the inner surface 206 may include structures known in the art for a surface of a thrust foil gas bearing to form a layer of compressed gas.

During normal operation of the compressor 100, the shaft 130 does not contact the thrust foil gas bearing 260, and the upper surface 266 of the thrust foil gas bearing 260 is closer to the thrust surface 133 than the upper surface 288 of the thrust ball bearing 280. During normal operation, the thrust foil gas bearing 260 has a clearance $C_3$ and the thrust ball bearing 280 has a clearance $C_4$. The clearance $C_3$ is the minimum distance from the upper surface 266 of the thrust foil gas bearing 260 to the thrust surface 133 of the shaft 130 in the axial direction $D_4$. The clearance $C_4$ is the minimum distance from the upper surface 288 of the thrust ball bearing 280 to the thrust surface 133 of the shaft 130 in the axial direction $D_4$. The clearance $C_4$ of the thrust ball bearing 280 is larger than the clearance $C_3$ of the thrust foil gas bearing 260 ($C_4 > C_3$). The thrust ball bearing 280 does not provide axial support for the rotating shaft 130 during normal operation of the compressor 100. For example, the thrust ball bearing 280 is spaced apart from the thrust surface 133 of the thrust runner 132 during the normal operation of the compressor 100.

In an embodiment, the formed layer of compressed gas 268 compresses the bump foil 264 by at or about 3 to at or about 7% when the compressor 100 is operated at normal operation. In an embodiment, the amount of compression of the bump foil 264 caused by the layer of compressed gas depends on the stiffness of the bump foil 264.

A larger axial force is applied to the rotating shaft 130 when stall, surge, and/or a shock load occurs. For example, force $F_2$ in FIG. 6 represents a direction in which this larger axial force is applied in an embodiment. This larger axial force is greater than the support provided by the layer of compressed gas 268. Thus, the thrust surface 133 of the shaft 130 is pushed into contact with the upper surface 266 of the thrust foil gas bearing 260 and compresses the bump foil 264 during stall, surge, and/or a shock load. The thrust surface 133 of the shaft 130 contacts the upper surface 288 of the thrust ball bearing 280 after compressing the bump foil 264 by a predetermined amount. The thrust ball bearing 280 then axially supports the shaft 130, which prevents the bump foil 264 from being compressed further.

The thrust ball bearing 280 is configured to limit the amount that the shaft 130 is able to compress the bump foil 264 and prevent the shaft 130 from plastically deforming the bump foil 264 as similarly discussed with respect to the radial ball bearing 220 and the bump foil 204 of the radial foil gas bearing 200. The thrust ball bearing 280 contacts the thrust surface 133 and axially supports the shaft 130 in the axial direction $D_4$ when the bump foil 264 is compressed by a predetermined amount. In an embodiment, plastic deformation of the bump foil 264 occurs once the bump foil 264 is compressed by at least an amount. For example, this amount can vary based on the structure and configuration of the bump foil 264 (e.g., stiffness, shape, construction material(s) of the bump foil 264, or the like). The predetermined amount is an amount that is less than the amount at which the bump foil 264 begins to be plastically deformed. For example, the predetermined amount is a percentage (e.g., the thrust ball bearing 280 only allows for the bump foil 264 to be compressed by up to X percent). The predetermined amount is the maximum amount that the bump foil 264 can be compressed by thrust runner 132 of the rotating shaft 130.

In an embodiment, the clearance $C_4$ of the thrust ball bearing 280 is based on this maximum amount of compression allowed by the thrust ball bearing 280. The predetermined amount may be selected based on the particular structure and configuration of the thrust foil gas bearing 260 (e.g., diameter, location, stiffness, or the like) and the compression at which the bump foil 264 is plastically deformed. In an embodiment, the predetermined amount may be an amount that at or about 30% or less than 30% and greater than 0%. In an embodiment, the predetermined amount may be an amount that at or about 50% or less than 50% and greater than 0%. In an embodiment, the predetermined amount may be greater than the compression caused by the forming the layer of compressed gas.

The bump foil 264 has a height $h_2$ and the top foil 262 has a thickness $T_2$. The thickness $T_2$ of the top foil 262 is measured in the axial direction $D_4$. The height $h_2$ of the bump foil 264 is measured in the axial direction $D_4$. In an embodiment, the height $h_2$ is the maximum distance from the housing 102 to an upper surface 265 of the bump foil 264 in the axial direction $D_4$. In an embodiment, the clearance $C_4$ of the thrust ball bearing 280 may be equal to or about the sum of the height $h_2$ of the bump foil 264 when compressed by the predetermined amount, the clearance $C_3$ of the thrust foil gas bearing 260, and the thickness $T_2$ of the top foil 262 ($C_4$ ($h_2$*predetermined amount of compression allowed)+ $C_3$+$T_2$). In an embodiment, the predetermined amount may be 50% (e.g., the thrust ball bearing 280 is configured to prevent the bump foil 264 from being compressed by more than 50%). In such an embodiment, the clearance $C_4$ of the thrust ball bearing 280 may be equal to or about the sum of 50% of the height $h_2$ of the bump foil 264, the clearance $C_3$ of the thrust foil gas bearing 260, and the thickness $T_2$ of the top foil 262 ($C_4 \approx 0.5*h_2+C_3+T_2$). In an embodiment, the width w of the thrust runner 132 may vary in the radial direction. In an embodiment, the clearance $C_2$ is increased or decreased when the width w results in the thrust surface 133 being positioned farther or closer along the thrust ball bearing 280 relative to the thrust foil gas bearing 260.

Figure 7:
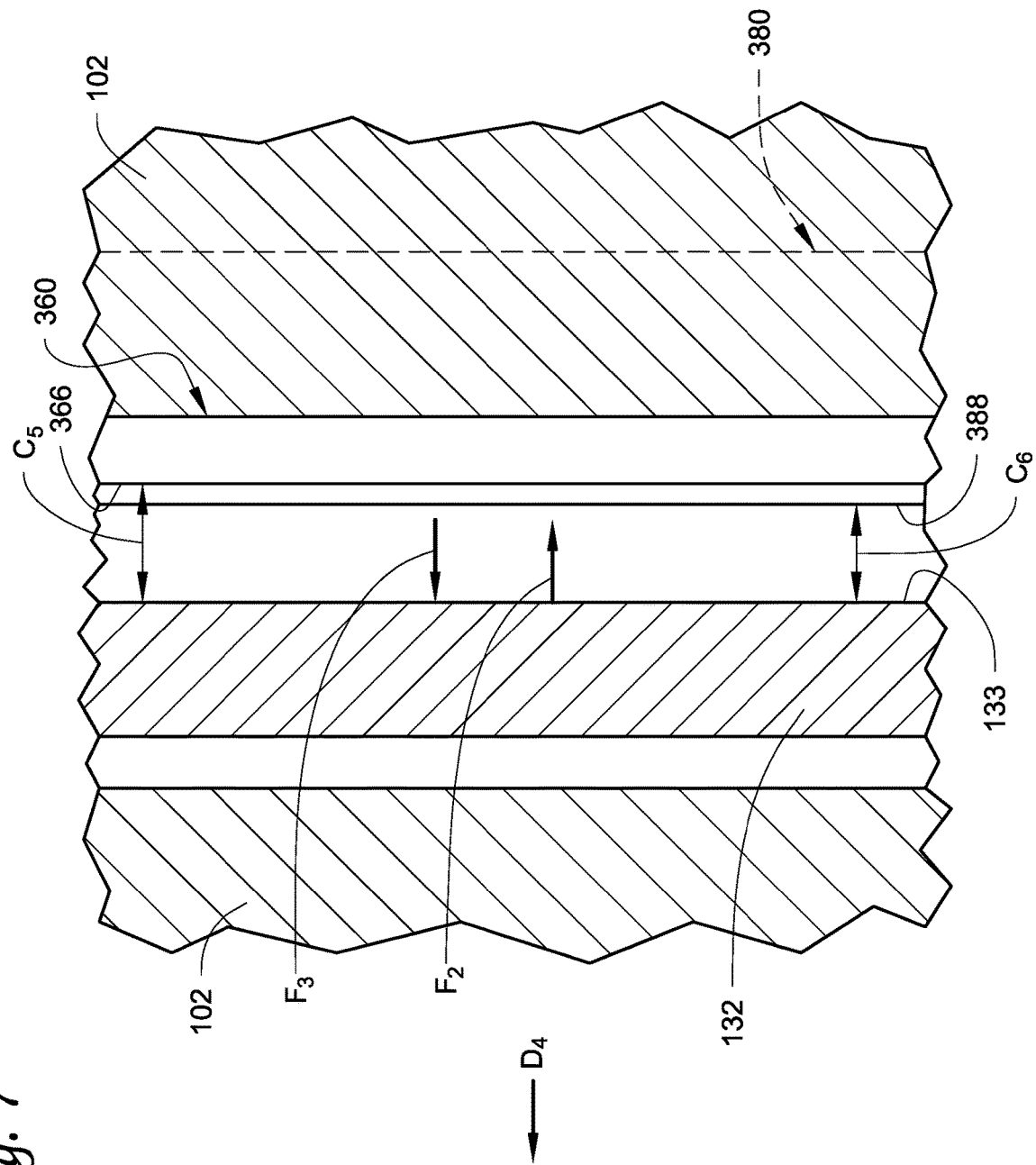
FIG. 7 shows an embodiment of a magnetic thrust bearing and a thrust ball bearing for axially supporting a shaft of a centrifugal compressor.

FIG. 7 illustrates an embodiment of a magnetic thrust bearing 360 and a thrust ball bearing 380 for providing axial support to the thrust runner 132. In such an embodiment, the magnetic thrust bearing 360 is provided instead of the thrust foil gas bearing 260. The magnetic thrust bearing 360 is attached to the housing 102 and has a similar position as the thrust foil gas bearing 260 in FIG. 3. As shown in FIG. 7, the thrust ball bearing 380 includes an upper surface 388 that faces the thrust surface 133 of the thrust runner 132 of the shaft 130 in the axial direction $D_4$. The thrust ball bearing 380 has a similar configuration as the thrust ball bearing 280 as described above, except with respect to the positioning of its upper surface 388.

As shown in FIG. 7, the magnetic thrust bearing 360 includes an upper surface 366 that faces the thrust surface 133 of the thrust runner 132. The magnetic thrust bearing 360 applies a magnetic force $F_3$ to the thrust runner 132. The magnetic force $F_3$ supports the thrust runner 132 in the axial direction $D_4$. The magnetic thrust bearing 360 has a clearance $C_5$ that is the minimum distance between the upper surface 366 of the magnetic thrust bearing 360 and the thrust surface 133 of the thrust runner 132 in the axial direction $D_4$. The thrust ball bearing 380 has a clearance $C_6$ that is the minimum distance between the upper surface 388 of the thrust ball bearing 380 and the thrust surface 133 of the thrust runner 132 in the axial direction $D_4$. The upper surface 388 of the thrust ball bearing 380 is closer to the thrust runner 132 in the axial direction $D_4$ than the upper surface 366 of the magnetic thrust bearing 360 (i.e., $C_5 > C_6$).

During normal operation (e.g., not during surge, stall, and/or a shock load), the magnetic thrust bearing 360 axially supports the shaft 130, while the thrust ball bearing 380 does not provide axial support for the shaft 130. For example, the thrust ball bearing 380 is spaced apart from the thrust runner 132 in the axial direction $D_4$ during the normal operation. During surge, stall, and/or a shock load, the shaft 130 has a larger axial load (represented by force $F_2$ in FIG. 7), and the axial support provided by the magnetic thrust bearing 360 (represented by the Force $F_3$ in FIG. 7) becomes inadequate (i.e., $F_2 > F_3$ during surge, stall, and/or a shock load). The larger axial load forces the thrust surface 133 towards the upper surface 366 of the magnetic thrust bearing 360 and into contact with thrust ball bearing 380. The thrust ball bearing 380 provides axial support to the shaft 130 and prevents the thrust surface 133 from contacting the upper surface 366 of the magnetic thrust bearing 360 during stall, surge, and/or a shock load. For example, contact between the thrust surface 133 and the upper surface 366 of the magnetic thrust bearing 360 would damage the magnetic thrust bearing 360 and the thrust runner 132. The thrust ball bearing 380 is configured to backup the magnetic thrust bearing 360 and prevent damage during surge, stall, and/or a shock load.

Figure 8:
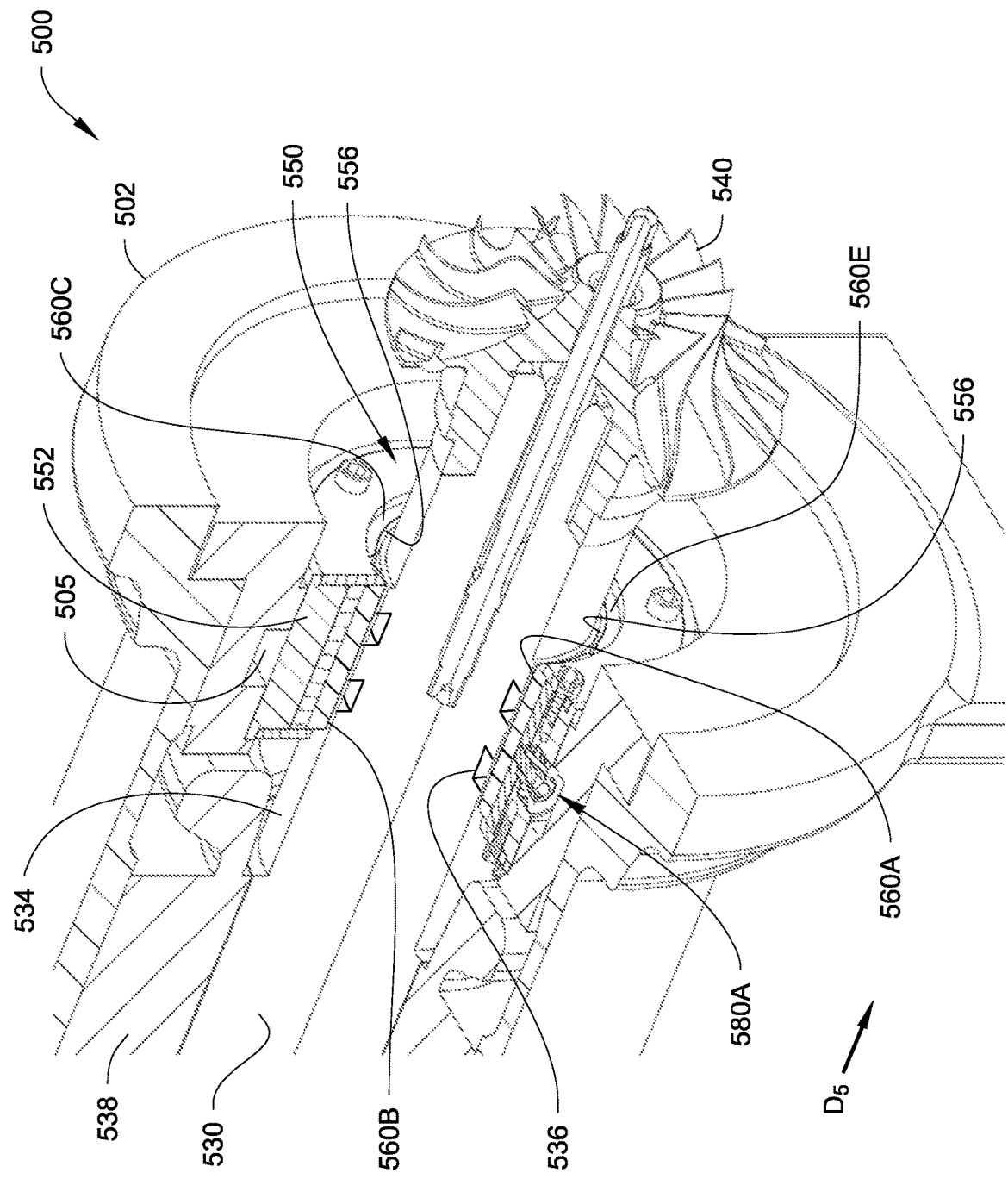
FIG. 8 is a cutaway view of an end portion of a centrifugal compressor in an embodiment.

FIG. 8 is a cutaway view of an end portion of a centrifugal compressor 500. In an embodiment, the centrifugal compressor 500 in FIG. 8 may be the compressor 10 employed in the heat transfer circuit 1 in FIG. 1 to compress working fluid. The compressor 500 includes a housing 502, a shaft 530, a stator 538, an impeller 540 attached to the shaft 530, and a radial mesh foil bearing 550. The housing 502 includes an endcap (not shown) for the impeller 540 similar to the endcap 108A in FIG. 3. Similar to the compressor 100 in FIG. 3, the stator 538 is configured to rotate the shaft 530 which rotates the attached impeller 540. The rotating impeller 540 compresses the working fluid within the compressor 500.

The shaft 530 has an external surface 534 that faces the radial mesh foil bearing 550. In an embodiment, herringbone grooves 536 are provided in the external surface 534 of the shaft 530 along the radial mesh foil bearing 550. The herringbone grooves 536 are discussed in more detail below.

The radial mesh foil bearing 550 is configured to radially support the shaft 530 as the shaft 530 rotates. In an embodiment, as the shaft 530 rotates, the radial mesh foil bearing 550 is configured to form a thin layer of compressed gas between the external surface 534 of the shaft 530 and inner surfaces 556 of the radial mesh foil bearing 550. The thin layer of compressed gas formed by the radial mesh foil bearing 550 radially supports the shaft 530.

The radial mesh foil bearing 550 includes an outer sleeve 552 that contacts the housing 502. The outer sleeve 552 is affixed to the housing 502. In an embodiment, the outer sleeve 552 is affixed to housing 502 by being pressure fit into the housing 502. The radial mesh foil bearing 550 includes pads 560A, 560B, 560C, 560E (one pad is obscured in FIG. 8) that provide the inner surfaces 556 of the radial mesh foil bearing 550.

The radial mesh foil bearing 550 includes an actuator 580A for each of the pads 560A, 560B, 560C, 560D, 560E (four of the actuators are obscured in FIG. 8), which are described in more detail below. In an embodiment, the housing 502 includes a groove 505 that extends circumferentially around the radial mesh foil bearing 550. The groove 505 is fluidly connected to each of the actuators 580A, 580B, 580C, 580D, 580E of the radial mesh foil bearing 550 (shown in FIG. 9). The groove 505 is pressurized with compressed gas to actuate each of the actuators 580A, 580B, 580C, 580D, 580E.

Figure 9:
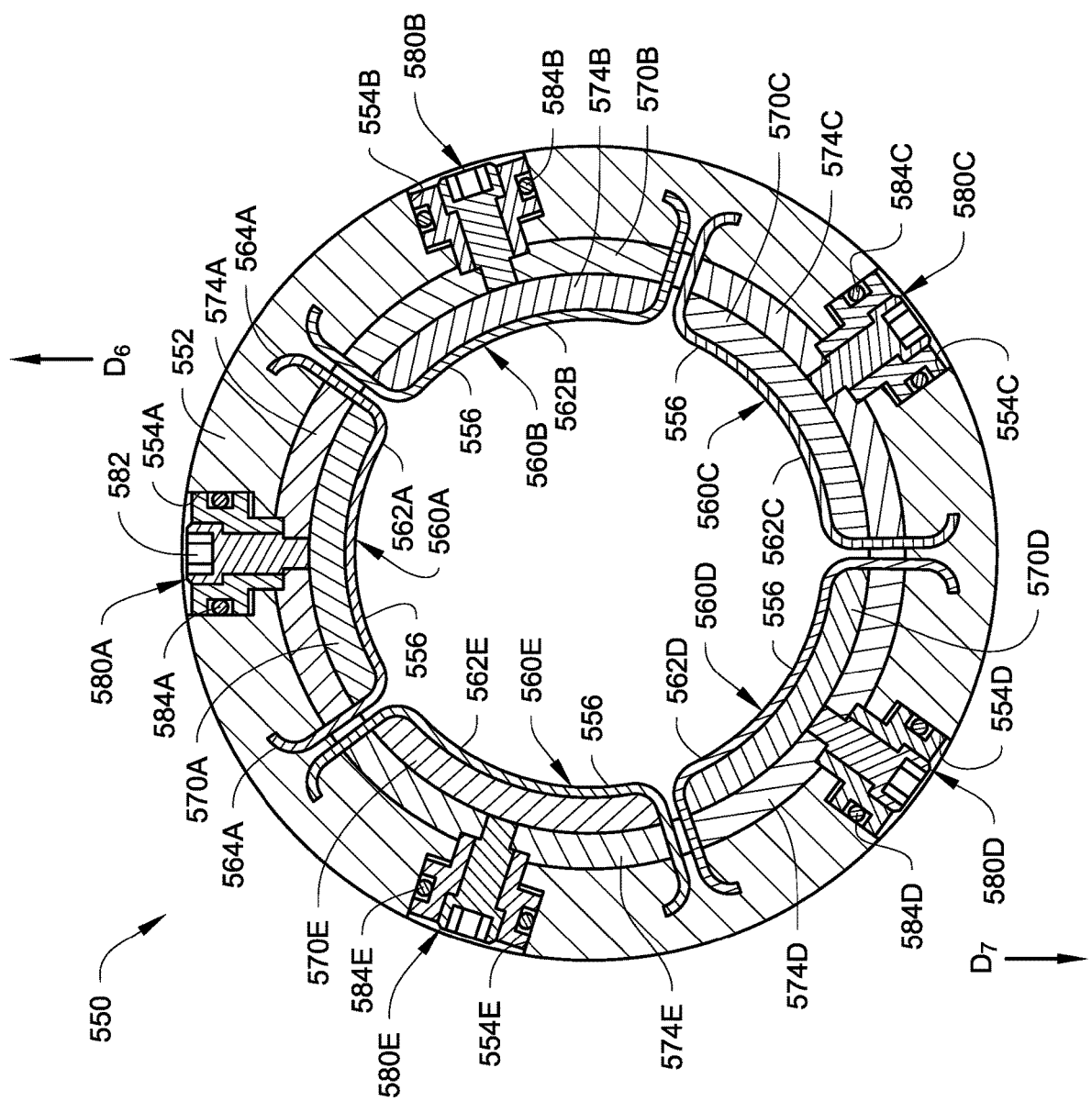
FIG. 9 is a cross-sectional view of a radial mesh foil bearing of the compressor in FIG. 8, according to an embodiment.

FIG. 9 is a cross-sectional view of the radial mesh foil bearing 550 in an embodiment. The cross-sectional in FIG. 9 is a plane extending along the radial direction of the radial mesh foil bearing 550 and bisects the radial mesh foil bearing 550 in the axial direction (e.g., in axial direction $D_5$ in FIG. 8). As shown in FIG. 9, the radial mesh foil bearing 550 includes five pads 560A, 560B, 560C, 560D, 560E.

A first pad 560A includes a top foil 562A, a wire mesh dampener 570A, and a back plate 574A. The back plate 574A and the wire mesh dampener 570A are disposed between the outer sleeve 552 and the top foil 562A in the radial direction $D_6$. The wire mesh dampener 570A is disposed between the top foil 562A and the back plate 574A. The top foil 562A is attached to the outer sleeve 552. In an embodiment, the top foil 562A has two ends 564A that are affixed to the outer sleeve 552. In an embodiment, the ends 564A are embedded in the outer sleeve 552. In an embodiment, the back plate 574A may be indirectly attached to the back plate 574A. In an embodiment, one or more springs (not shown) may be affixed to the outer sleeve 552 and the back plate 574A to indirectly attach the back plate 574A to the outer sleeve 552. In such an embodiment, the one or more springs may be axial adjacent to the wire mesh dampener 570A. In an embodiment, the top foil 562A is a metal plate. In an embodiment, the top foil 562A may be made of a wear-resistant material such as, but not limited to, a wear-resistant polymer material.

The wire mesh dampener 570A is made of metal mesh. In an embodiment, the metal mesh is made of entangled metal wire(s). There is gas (e.g., air, etc.) in the spaces of the wire mesh dampener 570A. The wire mesh dampener 570A is compressible as this gas can be displaced from within the wire mesh dampener 570A. This compressibility of the wire mesh dampener 570A allows the top foil 562A to be pushed radially outward (e.g., in direction $D_6$). The compression of the wire mesh dampener 570A increases the density of the wire mesh dampener 570A as the volume of the compressed wire mesh dampener 570A contains a lower percentage of air. This compressibility of the wire mesh dampener 570A allows for the top foil 562A to be pushed in the radially outward (e.g., in direction $D_6$). In an embodiment, the top foil 562A is more easily pushed radially outward (e.g., in direction $D_6$) when the wire mesh dampener 570A has a lower density. As the density of a wire mesh dampener 570A increases, the wire mesh dampener 570A is harder to compress and the top foil 562A is harder to push in the radially outward. The stiffness of the top foil 562A in the radial mesh foil bearing 550 increases as the wire mesh dampener 570A has an increased density.

The radial mesh foil bearing 550 includes the actuator 580A for the first pad 560A. The actuator 580A is disposed in and extends from a through-hole 554A of the outer sleeve 552. The actuator 580A is affixed to the back plate 574A of the first pad 560A. In an embodiment, the actuator 580A includes a screw 582 that is screwed into the back plate 574A to affix the actuator 580A to the back plate 574A. It should be appreciated that the actuator 580A may be attached to the back plate 574A in a different manner. In an embodiment, the actuator 580A may be welded to the back plate 574A. The actuator 580A is moveable relative to the outer sleeve 552, the wire mesh dampener 570A, and the top foil 562A. The actuator 580A when actuated is configured to actuate radially inward (e.g., in direction $D_7$) in the outer sleeve 552. The actuator 580A is actuated with compressed gas. In an embodiment, the compressed gas is provided from the groove 505 in the housing 502 as shown in FIG. 8 and discussed above.

When actuated, the actuator 580A moves the back plate 574A closer to the top foil 562A. This compresses the wire mesh dampener 570A between the back plate 574A and the top foil 562A. The compression of the wire mesh dampener 570A increases its density, which increases the stiffness of the top foil 562A and decreases the compressibility of the first pad 560A in the radial mesh foil bearing 550. The actuator 580A is configured to change the density of the wire mesh dampener 570A and the stiffness of the top foil 562A. In an embodiment, the actuator 580A is configured to be actuated to different amounts based on the desired stiffness for the top foil 562A. The actuator 580A in FIG. 9 is in an unactuated position (e.g., is not compressing the wire mesh dampener 570A). In an embodiment, the actuator 580A may be configured to compress the wire mesh dampener 570A to a variety of degrees. For example, the actuator 580A may be actuated to a degree that causes the top foil 562A a desired degree of stiffness.

In an embodiment, a seal 584A, 584B, 584C, 584D, 584E is provided in each of the through-holes 554A, 554B, 554C, 554D, 554E between the actuator 580A, 580B, 580C, 580D, 580E and the outer sleeve 552. Each seal 584A, 584B, 584C, 584D, 584E prevents the pressurized gas used to actuator the actuators 580A, 580B, 580C, 580D, 580E from flowing through a respective through-hole 554A, 554B, 554C, 554D, 554E and the outer sleeve 552 past the actuators 580A, 580B, 580C, 580D, 580E.

The above description is provided with respect to the pad 560A and the actuator 580A. However, it is noted that the radial mesh foil bearing 550 includes an actuator 580A, 580B, 580C, 580D, 580E for each of its pads 560A, 560B, 560C, 560D, 560E. The other pads 580B, 580C, 580D, 580E and other actuators 580B, 580C, 580D, 580E operate in a similar manner to the pad 580A and the actuator 580A as described above. For example, the other pads 560B, 560C, 560D, 560E each include a top foil 562B, 562C, 562D, 562E; a wire mesh dampener 570B, 570C, 570D, 570E; and a back plate 574B, 574C, 574D, 574E similar to the pad 570A. The top foils 562A, 562B, 562C, 562D, 562E provide the inner surfaces 556 of the radial mesh foil bearing 550 that form the thin layer of compressed gas that radially supports the shaft 530 while it rotates.

The radial mesh foil bearing 550 shown in FIGS. 8 and 9 includes five pads 560A, 560B, 560C, 560D, 560E. However, the radial mesh foil bearing 550 in an embodiment may include a different number of pads than 5. In an embodiment, the radial mesh foil bearing 550 may include a single continuous pad with multiple actuators 580A. In an embodiment, the radial mesh foil bearing 550 includes two or more pads 560A, 560B, 560C, 560D, 560E with two or more actuators 580A, 580B, 580C, 580D, 580E.

In an embodiment, to increase the stiffness of the radial mesh foil bearing 550, the groove 505 (shown in FIG. 8) is pressurized to actuate the actuators 580A, 580B, 580C, 580D, 580E, which compresses the wire mesh dampeners 570A, 570B, 570C, 570D, 570E in each of the pads 560A, 560B, 560C, 560D, 560E. The compressed wire meshes 570A, 570B, 570C, 570D, 570E have an increased density and provide the top foils 562A, 562B, 562C, 562D, 562E of radial mesh foil bearing 550 with increased stiffness. In an embodiment, the pressurized gas used to actuate the actuators 580A, 580B, 580C, 580D, 580E may be the working fluid discharged by the compressor 500. The actuation of the actuator 580A, 580B, 580C, 580D, 580E changes the geometry of the inner surface 556 of the radial mesh foil bearing 550. In an embodiment, changing the geometric reduces the cross-coupled stiffness of the radial mesh foil bearing 550, which advantageously provides more stable compressor operation at high rotational speeds. In an embodiment, changing the geometric increases the direct stiffness of the radial mesh foil bearing 550, which advantageously reduces wear by helping to levitate the shaft 530 at lower speeds. In an embodiment, the compressor 500 may be configured to provide pressurized gas provided to the actuators 580A, 580B, 580C, 580D, 580E based on the rotational speed of the shaft 530.

Figure 10:
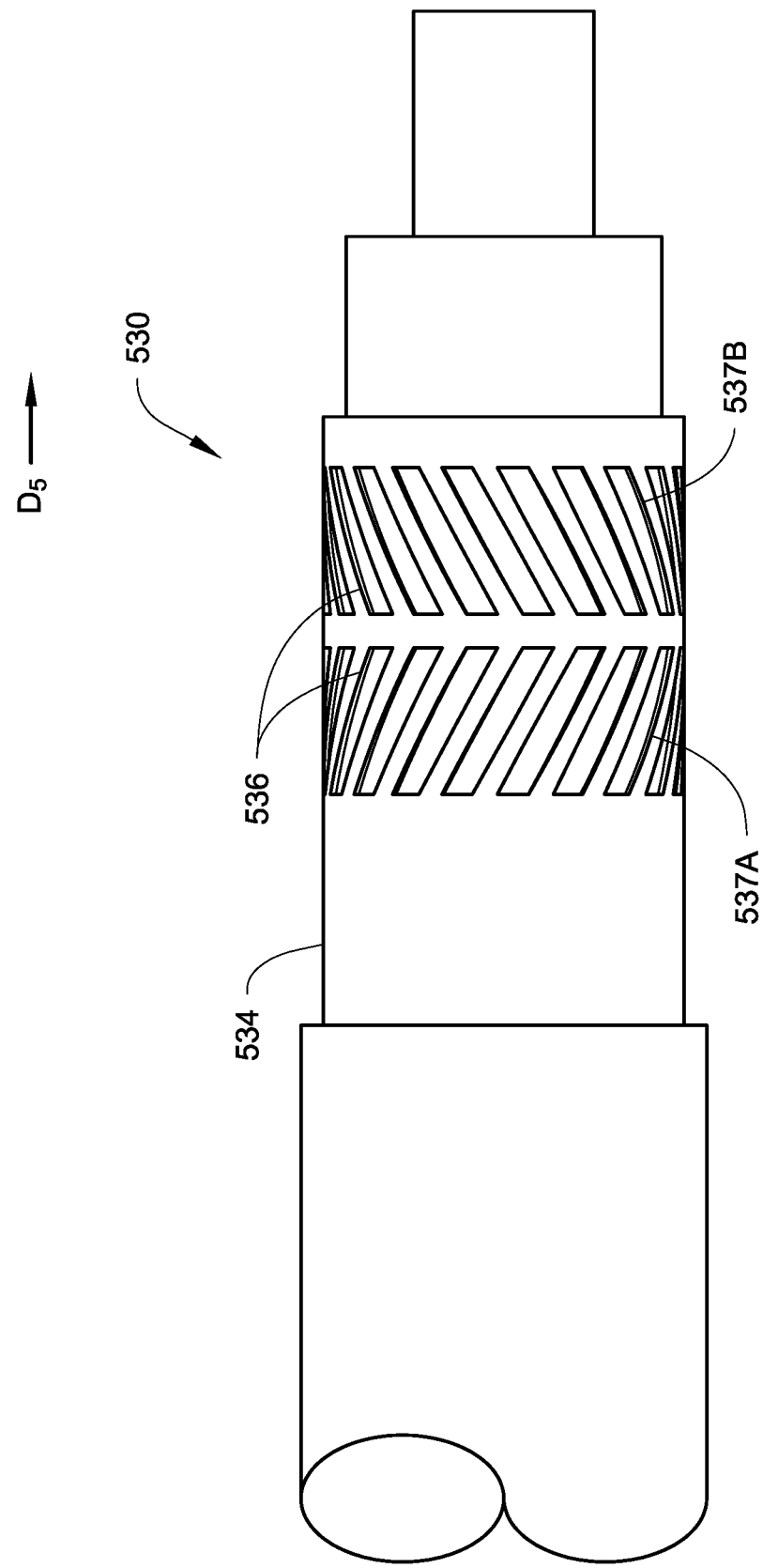
FIG. 10 is a partial side view of a shaft of the compressor in FIG. 8, according to an embodiment.

FIG. 10 is a side view of the end portion of the shaft 530 in FIG. 8. The shaft 530 includes the herringbone grooves 536 formed in its external surface 534. In an embodiment, the herringbone grooves 536 are provided along the entire circumference of the shaft 530. The herringbone grooves 536 include a first plurality of grooves 537A and a second plurality of grooves 537B. The grooves 537A and the grooves 537B are provided along different portions of the shaft 530 in the axial direction $D_5$. Each of the grooves 537A, 537B extends at an angle relative to the axial direction $D_5$ and relative to an angle that is perpendicular to the axial direction $D_5$. The grooves 537A extend in a different direction than the grooves 537B. In an embodiment, the grooves 537A are symmetrical to the grooves 537B across a circumferential cross-section of the shaft 530. In an embodiment, the shaft 130 may include the herringbone grooves 536.

FIG. 8 shows a single radial mesh foil bearing 550 for the compressor 500. However, it should be understood that the compressor 500 in an embodiment may include multiple of the radial mesh foil bearing 550 to support the shaft 530. In an embodiment, the compressor 500 may include one or more of the radial mesh foil bearings 550. In an embodiment, the compressor 500 may include a radial mesh foil bearings 550 at each end of the shaft 530 similar to the radial foil gas bearings 180, 200 in FIGS. 3 and 4. In an embodiment, the radial mesh foil bearing 550 may be provided with a backup radial ball bearing (e.g., radial ball bearing 220) as similarly discussed for the radial foil gas bearing 200 in FIGS. 3-5.

Aspects:

Any of aspects 1-8 can be combined with any of aspects 9-30, any of aspects 9-16 can be combined with any of aspects 17-30, and any of aspects 17-23 can be combined with any of aspects 24-30.

Aspect 1. A compressor, comprising:
  a housing;
  a shaft configured to be rotated relative to the housing to compress a fluid;
  a foil gas bearing for supporting the shaft while rotating; and
  a ball bearing at a different location along the shaft than the foil gas bearing, the ball bearing configured to contact and support the shaft while rotating when the shaft compresses the bump foil by a predetermined amount.

Aspect 2. The compressor of aspect 1, wherein the bump foil is closer to the shaft than the ball bearing when the shaft is spaced apart from the foil gas bearing.

Aspect 3. The compressor of aspect 1 or 2, wherein the ball bearing does not contact the shaft until the shaft compresses the bump foil by the predetermined amount.

Aspect 4. The compressor of any one of aspects 1-3, wherein the foil gas bearing is a radial foil gas bearing for radially supporting the shaft while rotating, and the ball bearing is a radial ball bearing configured to radially support the shaft while rotating when the shaft compresses the bump foil by the predetermined amount in a radial direction, and
  the different location along the shaft is a different axial location along the shaft.

Aspect 5. The compressor of aspect 4, wherein the radial ball bearing includes a side surface that contacts the housing in an axial direction, the radial ball bearing configured to axially support and radially support the shaft while rotating when the shaft compresses the bump foil by the predetermined amount.

Aspect 6. The compressor of any one of aspects 1-5, wherein the predetermined amount is an amount greater than 0% and less than about 50%.

Aspect 7. The compressor of any one of aspects 1-6, wherein the predetermined amount is an amount greater than 0% and less than about 30%.

Aspect 8. The compressor of any one of aspects 1-3, 6 and 7, wherein
  the shaft includes a thrust runner,
  the foil gas bearing is a thrust foil gas bearing for axially supporting the shaft while rotating,
  the ball bearing is a thrust ball bearing for axially supporting the shaft while rotating when the shaft compresses the bump foil by the predetermined amount in an axial direction, and
  the different location along the shaft is a different radial location along the thrust runner of the shaft.

Aspect 9. A heat transfer circuit, comprising:
  a compressor including:
    a shaft rotatable to compress a working fluid,
    a foil gas bearing for supporting the shaft while rotating, the foil bearing including a top foil and a bump foil, and
    a ball bearing located at a different location along the shaft than the foil gas bearing, the ball bearing configured to contact and support the shaft while rotating when the shaft compresses the bump foil by a predetermined amount;
  a condenser for cooling the working fluid compressed by the compressor;
  an expander for expanding the working fluid cooled by the condenser; and
  an evaporator for heating the working fluid expanded by the expansion device with a process fluid.

Aspect 10. The heat transfer circuit of aspect 9, wherein the bump foil is closer to the shaft than the ball bearing when the shaft is spaced apart from the foil gas bearing.

Aspect 11. The heat transfer circuit of aspect 9 or 10, wherein the ball bearing does not contact the shaft until the shaft compresses the bump foil by the predetermined amount.

Aspect 12. The heat transfer circuit of any one of aspects 9-11, wherein the foil gas bearing is a radial foil gas bearing for radially supporting the shaft while rotating, and the ball bearing is a radial ball bearing configured to radially support the shaft while rotating when the shaft compresses the bump foil by the predetermined amount in a radial direction, and
  the different location along the shaft is a different axial location along the shaft.

Aspect 13. The heat transfer circuit of aspect 12, wherein the radial ball bearing includes a side surface that contacts a housing of the compressor in an axial direction, the radial ball bearing configured to axially support and radially support the shaft while rotating when the shaft compresses the bump foil by the predetermined amount.

Aspect 14. The heat transfer circuit of any one of aspects 9-13, wherein the predetermined amount is an amount greater than 0% and less than about 50%.

Aspect 15. The heat transfer circuit of any one of aspects 9-13, wherein the predetermined amount is an amount greater than 0% and less than about 30%.

Aspect 16. The heat transfer circuit of any one of aspects 9-11, 14, and 15, wherein
  the shaft includes a thrust runner,
  the foil gas bearing is a thrust foil gas bearing for axially supporting the shaft while rotating,
  the ball bearing is a thrust ball bearing for axially supporting the shaft while rotating when the shaft compresses the bump foil by the predetermined amount in an axial direction, and
  the different location along the shaft is a different radial location along the thrust runner of the shaft.

Aspect 17. A compressor, comprising:
  a housing;
  a shaft configured to be rotated relative to the housing to compress a fluid;
  a mesh foil bearing for supporting the shaft while rotating, the mesh foil bearing including a pad and an actuator, the pad including a top foil and a wire mesh dampener, the actuator configured to be actuated with compressed gas to compress the wire mesh dampener.

Aspect 18. The compressor of aspect 17, wherein the compression of the wire mesh dampener increases a stiffness of the top foil.

Aspect 19. The compressor of aspect 17 or 18, wherein
  the pad includes a rear plate, the wire mesh dampener disposed between the rear plate and the top foil, the actuator affixed to the rear plate, and
  the actuation of the actuator moves the rear plate closer to the top foil to compress the wire mesh dampener.

Aspect 20. The compressor of any one of aspects 17-19, wherein the mesh foil bearing is a radial mesh foil bearing that includes an outer sleeve with a through-hole, the actuator extending through the through-hole in the outer sleeve.

Aspect 21. The compressor of aspect 20, wherein the mesh foil bearing includes a seal disposed in the through-hole between the actuator and the outer sleeve, the seal configured to prevent the compressed gas from flowing through the through-hole.

Aspect 22. The compressor of any one of aspects 17-21, wherein the housing includes a circumferential groove that extends along mesh foil bearing, the compressor configured to supply the compressed gas to the actuator through the circumferential groove.

Aspect 23. The compressor of any one of aspects 17-22, wherein the shaft has an external surface that faces the top foil of the mesh foil bearing, the external surface including a herringbone groove.

Aspect 24. A heat transfer circuit, comprising:
 a compressor including:
  a shaft rotatable to compress a working fluid,
  a mesh foil bearing for supporting the shaft while rotating, the mesh foil bearing including a pad and an actuator, the pad including a top foil and a wire mesh dampener, the actuator configured to be actuated with compressed gas to compress the wire mesh dampener;
 a condenser for cooling the working fluid compressed by the compressor;
 an expander for expanding the working fluid cooled by the condenser; and
 an evaporator for heating the working fluid expanded by the expansion device with a process fluid.

Aspect 25. The heat transfer circuit of aspect 24, wherein the compression of the wire mesh dampener increases a stiffness of the top foil.

Aspect 26. The heat transfer circuit of aspect 24 or 25, wherein
 the pad includes a rear plate, the wire mesh dampener disposed between the rear plate and the top foil, the actuator affixed to the rear plate, and
 the actuation of the actuator moves the rear plate closer to the top foil to compress the wire mesh dampener.

Aspect 27. The heat transfer circuit of any one of aspects 24-26, wherein the mesh foil bearing is a radial mesh foil bearing that includes an outer sleeve with a through-hole, the actuator extending through the through-hole in the outer sleeve.

Aspect 28. The heat transfer circuit of aspect 27, wherein the mesh foil bearing includes a seal disposed in the through-hole between the actuator and the outer sleeve, the seal configured to prevent the compressed gas from flowing through the through-hole.

Aspect 29. The heat transfer circuit of any one of aspects 24-28, wherein the compressor includes a housing with a circumferential groove that extends along the mesh foil bearing, the heat transfer circuit configured to supply the compressed gas to the actuator through the circumferential groove.

Aspect 30. The heat transfer circuit of any one of aspects 24-29, wherein the shaft has an external surface that faces the top foil of the mesh foil bearing, the external surface including a herringbone groove.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A compressor, comprising:
 a housing;
 a shaft configured to be rotated relative to the housing to compress a fluid;
 a mesh foil bearing for supporting the shaft while rotating, the mesh foil bearing including a pad, an actuator, and an outer sleeve, the pad including:
  a top foil having ends that are affixed to the outer sleeve,
  a rear plate, and
  a wire mesh dampener disposed between the top foil and the rear plate,
  wherein the actuator is configured to be actuated with compressed gas to move the rear plate closer to the top foil which compresses the wire mesh dampener between the rear plate and the top foil that is affixed to the outer sleeve.

2. The compressor of claim 1, wherein the compression of the wire mesh dampener increases a stiffness of the top foil.

3. The compressor of claim 1, wherein the actuator is affixed to the rear plate.

4. The compressor of claim 1, wherein the mesh foil bearing is a radial mesh foil bearing that includes the outer sleeve with a through-hole, the actuator extending through the through-hole in the outer sleeve.

5. The compressor of claim 4, wherein the mesh foil bearing includes a seal disposed in the through-hole between the actuator and the outer sleeve, the seal configured to prevent the compressed gas from flowing through the through-hole.

6. The compressor of claim 1, wherein the shaft has an external surface that faces the top foil of the mesh foil bearing, the external surface including a herringbone groove.

7. A compressor, comprising:
 a housing;
 a shaft configured to be rotated relative to the housing to compress a fluid; and
 a mesh foil bearing for supporting the shaft while rotating, the mesh foil bearing including a pad and an actuator, the pad including a top foil and a wire mesh dampener, the actuator configured to be actuated with compressed gas to compress the wire mesh dampener,
 wherein the housing includes a circumferential groove that extends along the mesh foil bearing, the compressor configured to supply the compressed gas to the actuator through the circumferential groove.

8. A heat transfer circuit, comprising:
 a compressor including:
  a housing,
  a shaft rotatable relative to the housing to compress a working fluid,
  a mesh foil bearing for supporting the shaft while rotating,
  the mesh foil bearing including a pad, an actuator, and an outer sleeve, the pad including:
   a top foil having ends that are affixed to the outer sleeve,
   a rear plate, and
   a wire mesh dampener disposed between the top foil and the rear plate, wherein the actuator is configured to be actuated with compressed gas to move the rear plate closer to the top foil which compresses the wire mesh dampener between the rear plate and the top foil that is affixed to the outer sleeve;
 a condenser for cooling the working fluid compressed by the compressor;

an expander for expanding the working fluid cooled by the condenser; and an evaporator for heating the working fluid expanded by the expansion device with a process fluid.

9. The heat transfer circuit of claim 8, wherein the compression of the wire mesh dampener increases a stiffness of the top foil.

10. The heat transfer circuit of claim 8, wherein the actuator is affixed to the rear plate.

11. The heat transfer circuit of claim 8, wherein the mesh foil bearing is a radial mesh foil bearing that includes the outer sleeve with a through-hole, the actuator extending through the through-hole in the outer sleeve.

12. The heat transfer circuit of claim 11, wherein the mesh foil bearing includes a seal disposed in the through-hole between the actuator and the outer sleeve, the seal configured to prevent the compressed gas from flowing through the through-hole.

13. The heat transfer circuit of claim 8, wherein the housing includes a circumferential groove that extends along the mesh foil bearing, the heat transfer circuit configured to supply the compressed gas to the actuator through the circumferential groove.

14. The heat transfer circuit of claim 8, wherein the shaft has an external surface that faces the top foil of the mesh foil bearing, the external surface including a herringbone groove.

* * * * *